(12) United States Patent
Li et al.

(10) Patent No.: US 12,096,325 B2
(45) Date of Patent: Sep. 17, 2024

(54) SIM TOOLKIT SCHEDULING FOR MULTIPLE ENABLED eSIM PROFILES

(71) Applicant: Apple Inc., Cupertino, CA (US)

(72) Inventors: Li Li, Los Altos, CA (US); Rajeev Verma, San Jose, CA (US); Dennis D. Conway, San Jose, CA (US)

(73) Assignee: Apple Inc., Cupertino, CA (US)

(*) Notice: Subject to any disclaimer, the term of this patent is extended or adjusted under 35 U.S.C. 154(b) by 379 days.

(21) Appl. No.: 17/804,291

(22) Filed: May 26, 2022

(65) Prior Publication Data

US 2022/0394443 A1 Dec. 8, 2022

Related U.S. Application Data

(60) Provisional application No. 63/197,470, filed on Jun. 6, 2021.

(51) Int. Cl.
*H04W 4/60* (2018.01)
(52) U.S. Cl.
CPC ..................... *H04W 4/60* (2018.02)
(58) Field of Classification Search
CPC ....................................... H04W 4/60
USPC ......................................... 455/418
See application file for complete search history.

(56) References Cited

U.S. PATENT DOCUMENTS

| 10,708,761 | B1 | 7/2020 | Mn et al. | |
| 2011/0217969 | A1* | 9/2011 | Spartz | H04W 76/16 455/422.1 |
| 2016/0020803 | A1 | 1/2016 | Cha et al. | |
| 2018/0249322 | A1 | 8/2018 | Kim et al. | |
| 2019/0098475 | A1 | 3/2019 | Yang et al. | |

FOREIGN PATENT DOCUMENTS

| KR | 20160010236 A | 1/2016 |
| WO | 2019119544 A1 | 6/2019 |

OTHER PUBLICATIONS

Korean Patent Application No. 10-2022-0067989—Notice of Preliminary Rejection dated Oct. 19, 2023.
European Patent Application 22176233.9—Extended European Search Report dated Oct. 26, 2022.

* cited by examiner

*Primary Examiner* — Mark G. Pannell
(74) *Attorney, Agent, or Firm* — DICKINSON WRIGHT RLLP

(57) ABSTRACT

This Application sets forth techniques for managing subscriber identity module (SIM) toolkit (STK) scheduling for multiple enabled electronic subscriber identity module (eSIM) profiles on an embedded universal integrated circuit card (eUICC) of a wireless device, including managing multiple STK sessions at a baseband processor external to the eUICC of the wireless device. To forestall STK communication for different eSIMs from interfering with execution of processes associated with the eSIMs, a baseband processor can schedule STK sessions to avoid overlap and reduce opportunities for errors in handling eSIM processes. The baseband processor can prioritize whether to queue commands for a second STK session for a second eSIM until a first STK session for a first eSIM ends or to terminate the first STK session to handle the second STK session.

20 Claims, 18 Drawing Sheets

SIM TOOLKIT SCHEDULING FOR MULTIPLE ENABLED eSIM PROFILES

CROSS-REFERENCE TO RELATED APPLICATIONS

The present application claims the benefit of U.S. Provisional Application No. 63/197,470, entitled "SIM TOOLKIT SCHEDULING FOR MULTIPLE ENABLED ESIM PROFILES," filed Jun. 6, 2021, the content of which is incorporated herein by reference in its entirety for all purposes.

FIELD

The described embodiments set forth techniques for managing subscriber identity module (SIM) toolkit (STK) scheduling for multiple enabled electronic SIM (eSIM) profiles on an embedded universal integrated circuit card (eUICC) of a wireless device, including managing multiple STK sessions at a baseband processor external to the eUICC of the wireless device.

BACKGROUND

Wireless mobile network operators (MNOs) continue to upgrade wireless networks to support newer wireless communication standards, including fourth generation (4G) Long Term Evolution (LTE) and Long Term Evolution Advanced (LTE-A) technologies as well as fifth generation (5G) technologies. Wireless devices continue to evolve to incorporate newer, configurable wireless credentials, such as eSIMs that can be loaded to and subsequently activated on an eUICC of a wireless device. To support newer 5G wireless communication standards, specifications for eSIMs for 5G enabled wireless devices are being developed and standardized. With downloadable eSIMs becoming available to provide ready access to various wireless services, use of multiple eSIMs on a wireless device, including concurrent use of multiple eSIMs on an eUICC of a wireless device is proposed. Communication between the eUICC of a wireless device and a baseband processor external to the eUICC for a new STK session, e.g., for a second eSIM, can interrupt processing of STK commands resulting in errors for an ongoing STK session, e.g., for a first eSIM.

SUMMARY

Representative embodiments set forth techniques for managing subscriber identity module (SIM) toolkit (STK) scheduling for multiple enabled electronic subscriber identity module (eSIM) profiles on an embedded universal integrated circuit card (eUICC) of a wireless device, including managing multiple STK sessions at a baseband processor external to the eUICC of the wireless device. With downloadable eSIMs becoming available to provide ready access to various wireless services, use of multiple eSIMs on a wireless device, including concurrent use of multiple eSIMs on an eUICC of a wireless device is proposed. Communication between the eUICC of a wireless device and a processor external to the eUICC is managed using logical channels. Communication with an eSIM can include a logical channel assigned for STK communication of an STK session. An eUICC operation system (OS) of the eUICC may be unable to handle multiple, parallel STK sessions for communication with multiple eSIMs. To forestall STK communication for different eSIMs from interfering with execution of processes associated with the eSIMs, an external processor of the wireless device, e.g., a baseband processor, can schedule STK sessions to avoid overlap and reduce opportunities for errors in handling eSIM processes. The external processor can monitor for any ongoing proactive STK sessions associated with an eSIM of the eUICC, where the eUICC includes multiple eSIMs and supports multiple enabled eSIMs. User inputs that indicate one or more STK actions to be performed for a first eSIM of the eUICC can be reviewed by an STK scheduler process of the external processor before execution. When there are no ongoing STK sessions for other eSIMs of the eUICC, the STK scheduler can allow one or more STK actions for the first eSIM to be performed. When there is an ongoing proactive STK session for a second eSIM of the eUICC, the STK scheduler can determine whether at least one of the one or more STK actions for the first eSIM has a priority that supersedes the ongoing proactive STK session for the second eSIM. When none of the one or more STK actions have superseding priority, the STK scheduler can add one or more entries to a queue to perform the one or more STK actions for the first eSIM after the proactive STK session for the second eSIM concludes. When at least one of the one or more STK actions does have superseding priority, the STK scheduler can send a message to the eUICC to terminate the ongoing proactive STK session for the second eSIM and can subsequently perform the one or more STK actions for the first eSIM after the proactive STK session for the second eSIM terminates. In some embodiments, user inputs include one or more of: enabling one or more eSIMs of the eUICC of the wireless device; enabling multiple eSIMs of the eUICC of the wireless device; initiating a mobile originated (MO) voice call by the wireless device; initiating an MO voice call with high priority, such as an emergency call, by the wireless device; performing an international mobile subscriber identity (IMSI) switch by the wireless device, e.g., while moving to a roaming network area; performing a bearer independent protocol (BIP) session for an eSIM on the eUICC, such as for an over-the-air update of the eSIM.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
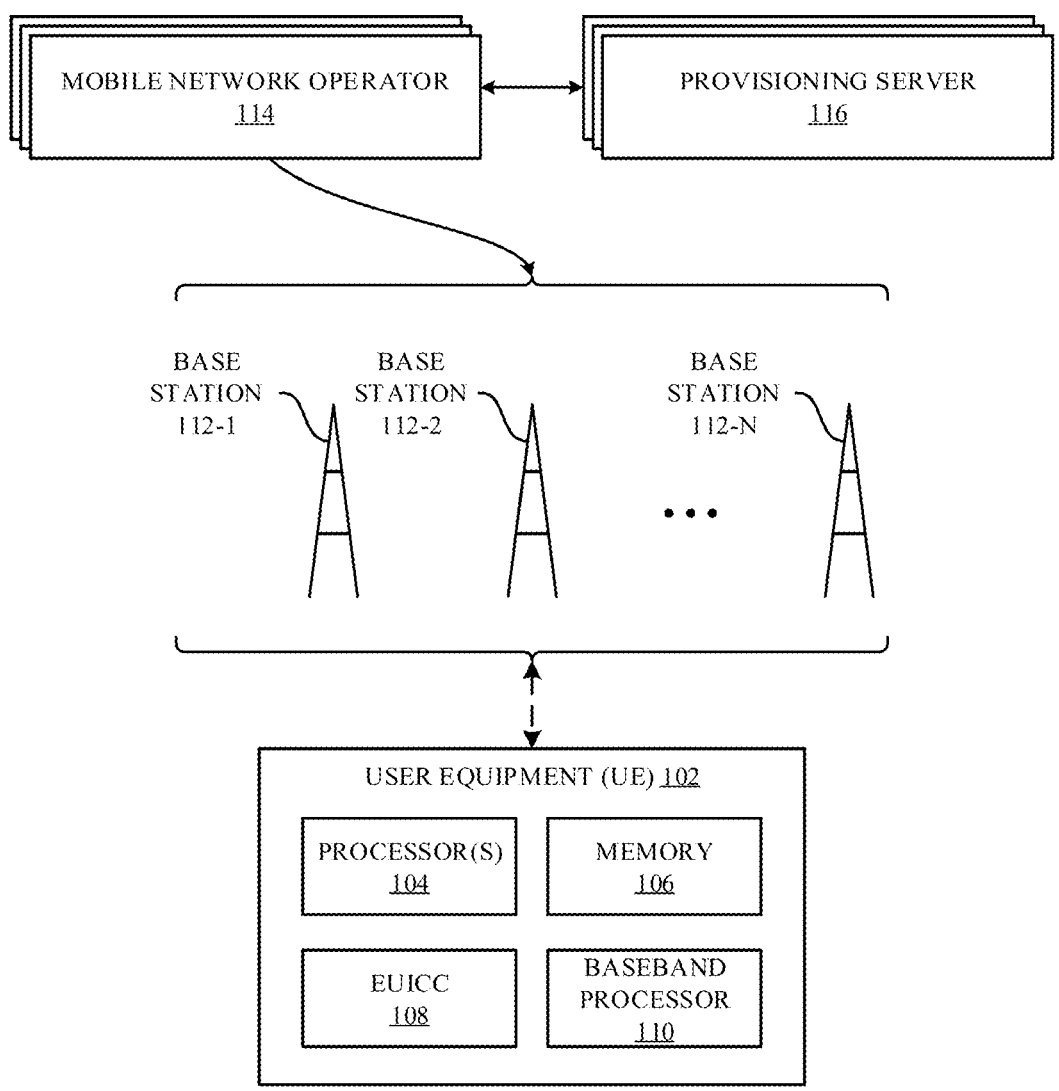
FIG. 1 illustrates a block diagram of different components of an exemplary system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Representative embodiments set forth techniques for managing subscriber identity module (SIM) toolkit (STK) scheduling for multiple enabled electronic subscriber identity module (eSIM) profiles on an embedded universal integrated circuit card (eUICC) of a wireless device, including managing multiple STK sessions at a baseband processor external to the eUICC of the wireless device. With downloadable eSIMs becoming available to provide ready access to various wireless services, use of multiple eSIMs on a wireless device, including concurrent use of multiple eSIMs on an eUICC of a wireless device is proposed. Communication between the eUICC of a wireless device and a processor external to the eUICC is managed using logical channels. Communication with an eSIM can include a logical channel assigned for STK communication of an STK session. An eUICC operation system (OS) of the eUICC may be unable to handle multiple, parallel STK sessions for communication with multiple eSIMs. To forestall STK communication for different eSIMs from interfering with execution of processes associated with the eSIMs, an external processor of the wireless device, e.g., a baseband processor, can schedule STK sessions to avoid overlap and reduce opportunities for errors in handling eSIM processes. The external processor can monitor for any ongoing proactive STK sessions associated with an eSIM of the eUICC, where the eUICC includes multiple eSIMs and supports multiple enabled eSIMs. User inputs that indicate one or more STK actions to be performed for a first eSIM of the eUICC can be reviewed by an STK scheduler process of the external processor before execution. When there are no ongoing STK sessions for other eSIMs of the eUICC, the STK scheduler can allow the one or more STK actions for the first eSIM to be performed. When there is an ongoing proactive STK session for a second eSIM of the eUICC, the STK scheduler can determine whether the one or more STK actions for the first eSIM have a priority that supersedes the ongoing proactive STK session for the second eSIM. When the one or more STK actions do not have superseding priority, the STK scheduler can add one or more entries to a queue to perform the one or more STK actions for the first eSIM after the proactive STK session for the second eSIM concludes. When the one or more STK actions do have superseding priority, the STK scheduler can send a message to the eUICC to terminate the ongoing proactive STK session for the second eSIM and can subsequently perform the one or more STK actions for the first eSIM after the proactive STK session for the second eSIM terminates. In some embodiments, user inputs include one or more of: enabling one or more eSIMs of the eUICC of the wireless device; enabling multiple eSIMs of the eUICC of the wireless device; initiating a mobile originated (MO) voice call by the wireless device; initiating an MO voice call with high priority, such as an emergency call, by the wireless device; performing an international mobile subscriber identity (IMSI) switch by the wireless device while moving to a roaming network area; performing a bearer independent protocol (BIP) session for an eSIM on the eUICC, such as for an over-the-air update of the eSIM.

These and other embodiments are discussed below with reference to FIGS. 1 through 11; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a user equipment (UE) 102, a group of base stations 112-1 to 112-n that are managed by different Mobile Network Operators (MNOs) 114, and a set of provisioning servers 116 that are in communication with the MNOs 114. The UE 102 can represent a mobile computing device (e.g., an iPhone® or an iPad® by Apple®), the base stations 112-1 to 112-n can represent cellular wireless network entities including evolved NodeBs (eNBs) and/or next generation NodeBs (gNBs or gNB) that are configured to communicate with the UE 102, and the MNOs 114 can represent different wireless service providers that provide specific services (e.g., voice and data) to which the UE 102 can be subscribed. The UE 102 may also be referred to as a wireless device, a mobile device, a mobile wireless device, or the like.

As shown in FIG. 1, the UE 102 can include processing circuitry, which can include one or more processors 104 and memory 106, an embedded Universal Integrated Circuit Card (eUICC) 108, and a baseband processor 110. In some embodiments, the UE 102 includes one or more physical UICC cards, also referred to as Subscriber Identity Module (SIM) cards (not shown), in addition to or substituting for the eUICC. The components of the UE 102 work in conjunction to enable the UE 102 to provide useful features to a user of the UE 102, such as localized computing, location-based services, and Internet connectivity. The eUICC 108 can be configured to store multiple electronic SIMs (eSIMs) for accessing different services offered by one or more MNOs 114 through base stations 112-1 to 112-n. For example, the eUICC 108 can be configured to store and manage one or more eSIMs for one or more MNOs 114 for different subscriptions to which the UE 102 has been associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the UE 102, the MNOs 114, third party entities, and the like. Communication of eSIM data between a provisioning server 116 and the eUICC 108 (or between the provisioning server 116 and processing circuitry of the UE 102 external to the eUICC 108, e.g., the processor 104) can use a secure communication channel. Multiple eSIMs can be downloaded to the eUICC 108 of the UE 102 from one or more provisioning servers 116 associated with one or more MNOs 114. The UE 102 can be configured to allow for multiple eSIMs to be enabled concurrently on the UE 102 to provide access to wireless services provided by the multiple eSIMs. Communication between the multiple eSIMs enabled on the eUICC 108 and processing circuitry external to the eUICC 108, e.g., to a processor 104 and/or to the baseband processor 110 can use logical channels. Communication with an eSIM can include a SIM toolkit (STK) session that uses a logical channel between the baseband processor 110 and the eSIM. An STK scheduler operating on the baseband processor 110 can review inputs that can result in actions that impact an ongoing STK session for an eSIM. Multiple, parallel STK sessions can be avoided by delaying initiation of a new STK session for a second eSIM while an ongoing proactive STK session for a first eSIM continues. In some instances, the proactive STK session for the first eSIM can be terminated prematurely to allow for establishing the new STK session for the second eSIM, when actions associated with the second eSIM have priority to supersede the STK session for the first eSIM.

Figure 2:
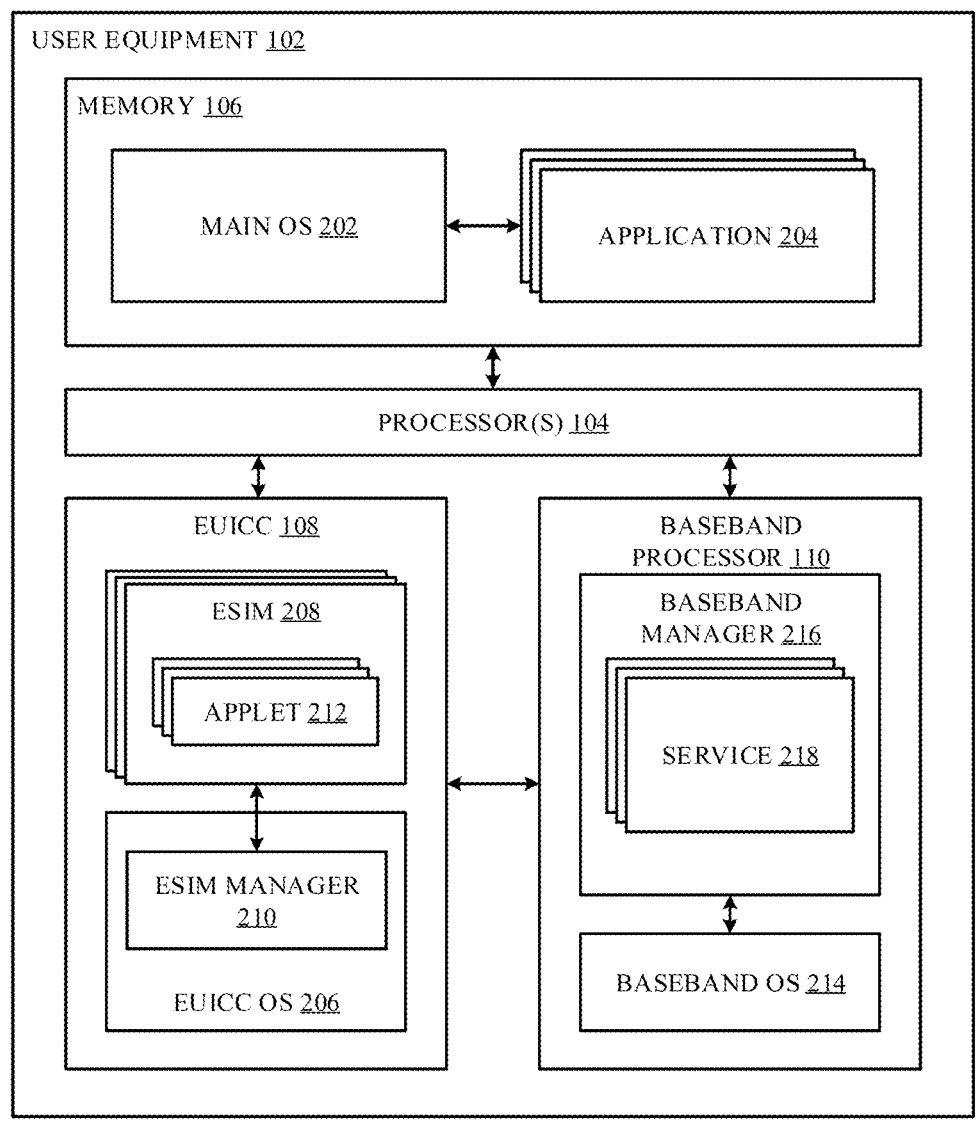
FIG. 2 illustrates a block diagram of a more detailed view of exemplary components of the system of FIG. 1, according to some embodiments.

FIG. 2 illustrates a block diagram of a more detailed view 200 of particular components of the UE 102 of FIG. 1, according to some embodiments. As shown in FIG. 2, the processor(s) 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by installing, enabling, disabling, modifying, or otherwise performing management of the eSIMs 208 within the eUICC 108 and providing the baseband processor 110 with access to the eSIMs 208 to provide access to wireless services for the UE 102. The eUICC 108 OS can include an eSIM manager 210, which can perform management functions for various eSIMs. According to the illustration shown in FIG. 2, each eSIM 208 can include a number of applets 212 that define the manner in which the eSIM 208 operates. For example, one or more of the applets 212, when implemented by the baseband processor 110 and the eUICC 108, can be configured to enable the UE 102 to communicate with an MNO 114 and provide useful features (e.g., voice connections, messaging services, internet access and the like) to a user of the UE 102.

As also shown in FIG. 2, the baseband processor 110 of the UE 102 can include a baseband OS 214 that is configured to manage hardware resources of the baseband processor 110 (e.g., a processor, a memory, different radio components, etc.). According to some embodiments, the baseband processor 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the UE 102 and MNOs 114 according to the different eSIMs 208 that are enabled within the eUICC 108. The baseband manager 216 can be further configured to include a SIM toolkit (STK) scheduler that manages STK sessions for communication with one or more eSIMs 208 on the eUICC 108.

Figure 3:
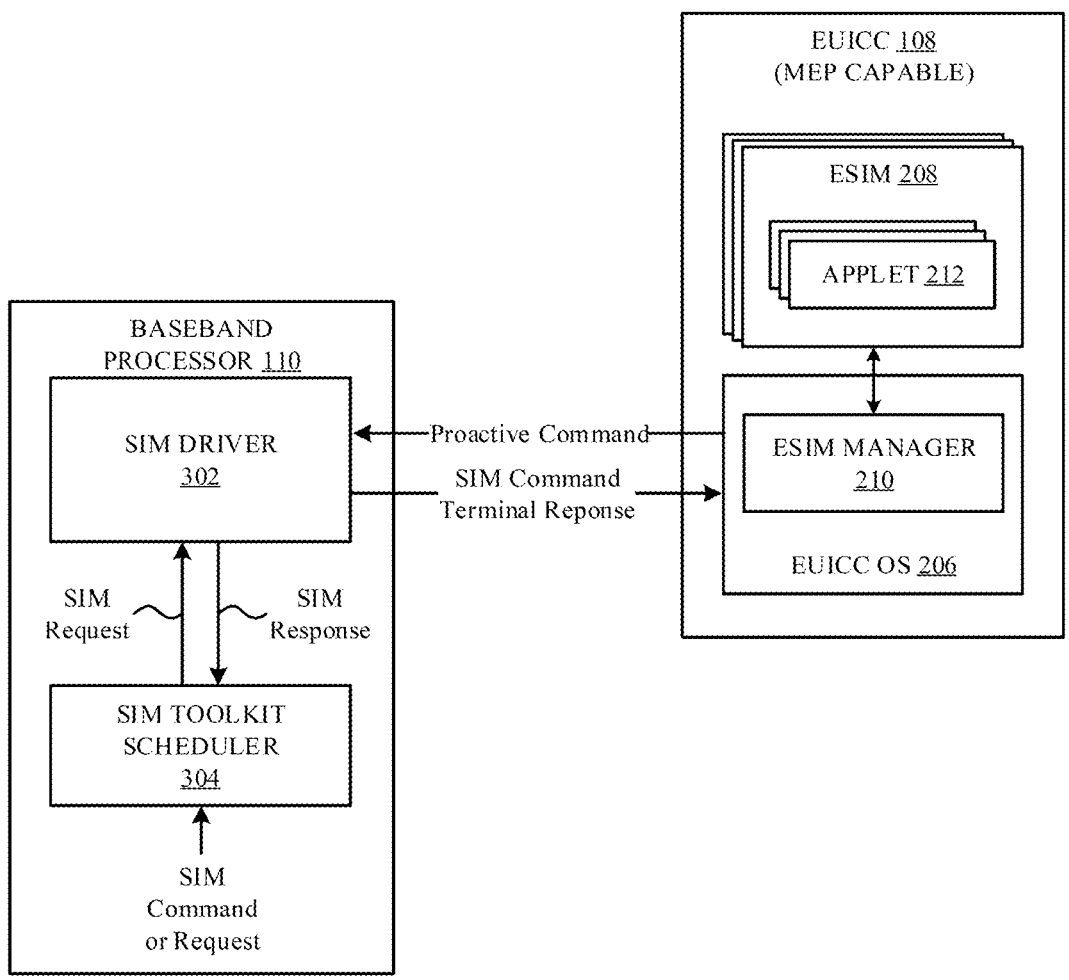
FIG. 3 illustrates communication between a baseband processor and an eUICC of a UE, according to some embodiments.

FIG. 3 illustrates a diagram 300 of communication between the baseband processor 110 of the UE 102 and the eUICC OS 206 of the eUICC 108 of the UE 102. The eUICC 108 of the UE 102 can be capable of simultaneously enabling multiple eSIM profiles, which can be referred to as a multiple enabled profile (MEP) capability. To reduce the opportunity for SIM toolkit (STK) sessions for different eSIMs 208 of the eUICC 108 interfering with each other, an STK scheduler 304 can monitor user input, or other actions generated by the UE 102, to schedule STK session communication for the eSIMs 208 of the eUICC 108. The STK scheduler 304 can receive SIM commands or requests, which can be associated with user inputs, that require actions to be performed by elements of the eUICC 108. The STK scheduler 304 can interface with a SIM driver 302 software component that can interface with the eUICC OS 206 of the eUICC 108 to communicate with an eSIM manager 210 therein, which can communicate with one or more of the eSIMs 208. The SIM driver 302 can receive SIM requests from the STK scheduler 304, which can result from one or more SIM commands or requests provided to the STK scheduler 304, and send SIM commands to the eUICC 108 to interact with the eUICC 108, the eUICC OS 206, and/or the eSIMs 208 via the eSIM manager 210. The SIM driver 302 can also communicate terminal responses to the eUICC 108 in response to communication from the eUICC 108. The eUICC 108 can also send proactive commands to the SIM driver 302 which can be processed further by the baseband processor 110. The STK scheduler 304 can manage STK sessions to reduce interference for communication with multiple eSIMs 208 of the eUICC 108. In some instances, the STK scheduler 304 can interrupt an ongoing STK session associated with a first eSIM 208 to perform a prioritized action for a second eSIM 208. In some instances, the STK scheduler 304 can delay establishing a new STK session (or delaying communication to the eUICC 108) for a second eSIM 208 that could interfere with an ongoing STK session for a first eSIM 208.

Figure 4A:
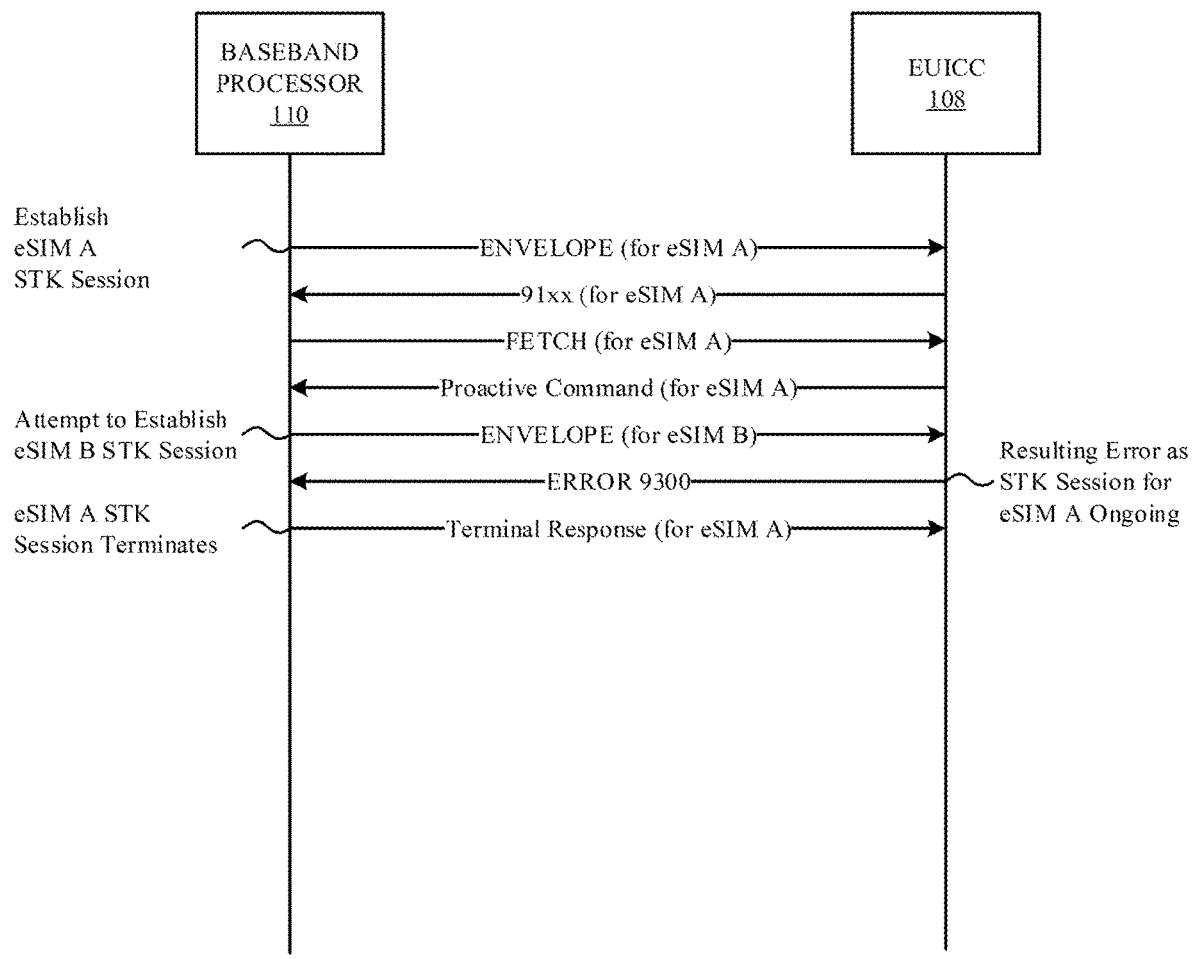
FIG. 4A illustrates an example of communication for multiple eSIMs without STK scheduling resulting in errors, according to some embodiments.

FIG. 4A illustrates a diagram 400 of communication between a baseband processor 110 of UE 102 and an eUICC 108 of UE 102, where the communication is intended for multiple eSIMs 208 and results in one or more errors. Initially, the baseband processor 110 sends an ENVELOPE message to the eUICC 108 in order to establish an STK session for a first eSIM 208, e.g., eSIM A. The eUICC 108 responds positively to the ENVELOPE message with an 91xx message to the baseband processor 110 establishing the STK session for eSIM A and indicating a pending proactive command. The baseband processor 110 subsequently sends a FETCH message to the eUICC 108 to retrieve the pending proactive command from the eUICC 108 for eSIM A. The eUICC 108 responds with the proactive command message for eSIM A that can indicate an action for the baseband processor 110 to take regarding eSIM A. Subsequently, without STK scheduling to separate STK sessions for different eSIMs to not overlap, the baseband processor 110 can send another ENVELOPE message to the eUICC 108, this ENVELOPE message directed to establishing a second STK session for a second eSIM 208, e.g., eSIM B. The eUICC 108 responds to the ENVELOPE message for the second eSIM 208 by sending a 9300 ERROR message to the baseband processor 110 indicating the eUICC 108 is busy and cannot respond to the second ENVELOPE message for establishing the second STK session for eSIM B. In some instances, the software component handling the STK sessions on the eUICC 108 can return an STK BUSY error indication. In some cases, the software component of the eUICC 108 cannot properly establish and maintain multiple, parallel STK sessions for multiple eSIMs 208 at the same time. In some embodiments, the software component handling the STK session on the eUICC 108 can result in one or more errors for handling messages or actions by the eUICC 108 for the ongoing STK session for the eSIM A. In some instances, the baseband processor 110 terminates the STK session for the SIM A in response to the 9300 ERROR message.

Figure 4B:
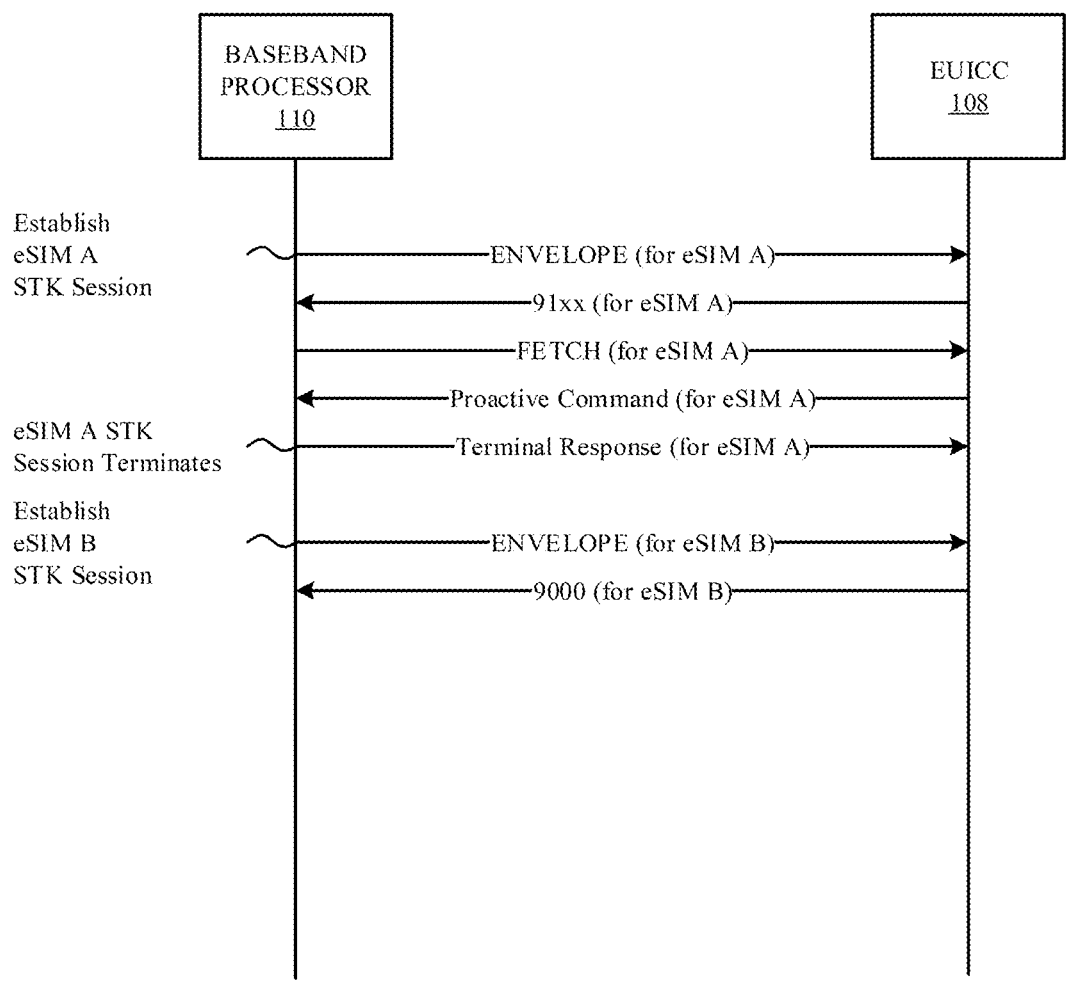
FIG. 4B illustrates an example of communication for multiple eSIMs with STK scheduling to reduce errors, according to some embodiments.

FIG. 4B illustrates a diagram 450 of communication between a baseband processor 110 of UE 102 and an eUICC 108 of UE 102, where communication intended for multiple eSIMs 208 are managed by an STK scheduler 304 on the baseband processor 110 to delay establishment of a second STK session for a second eSIM 208 until a first STK session for a first eSIM 208 terminates. Initially, the baseband processor 110 sends an ENVELOPE message to the eUICC 108 in order to establish an STK session for a first eSIM 208, e.g., eSIM A. The eUICC 108 responds positively to the ENVELOPE message with an 91xx message to the baseband processor 110 establishing the STK session for eSIM A and indicating a pending proactive command. The baseband processor 110 subsequently sends a FETCH message to the eUICC 108 to retrieve the pending proactive command from the eUICC 108 for eSIM A. The eUICC 108 responds with the proactive command message for eSIM A that can indicate an action for the baseband processor 110 to take regarding eSIM A. Subsequently, with STK scheduling to separate STK sessions for different eSIMs to not overlap, the baseband processor 110 can delay sending a message to establish a second STK session for a second eSIM 208, e.g., eSIM B, until after the STK session for the eSIM A concludes. The baseband processor 110 can send a terminal response message for eSIM A to the eUICC 108 to terminate the STK session for eSIM A, which can be as a result of completing actions required for the STK session for eSIM A or can result from an interrupt by a higher priority action that requires establishing an STK session for another eSIM, e.g., for eSIM B. After the STK session for eSIM A terminates, the baseband processor 110 can send another ENVELOPE message to the eUICC 108, this ENVELOPE message directed to establishing an STK session for a second eSIM 208, e.g., eSIM B. As the previous STK session for eSIM A has terminated, the STK session for eSIM B can be established, and the eUICC 108 responds to the ENVELOPE message for the second eSIM 208 by sending a 9000 status response message for eSIM B to the baseband processor 110. By delaying establishment of the STK session for eSIM B until after the STK session for eSIM A terminates, the baseband processor 110 (e.g., the STK scheduler therein) can reduce opportunities for errors caused by colliding messages for two different STK sessions for two different eSIMs 208 of the eUICC 108.

Figure 5A:
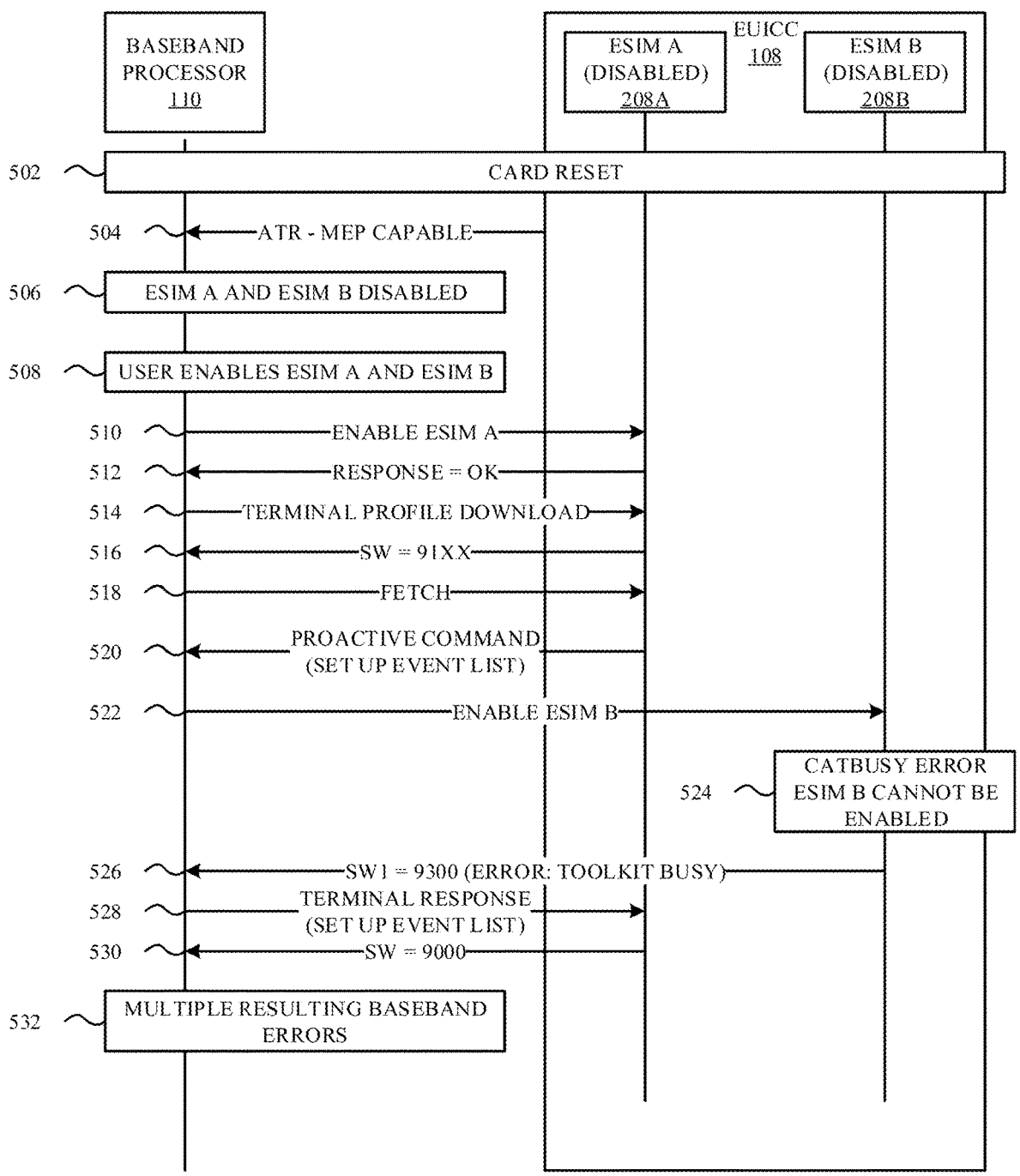
FIG. 5A illustrates an example of communication to enable multiple eSIMs without STK scheduling resulting in errors, according to some embodiments.

FIG. 5A illustrates a diagram 500 of communication between a baseband processor 110 of UE 102 and an eUICC 108 of UE 102, where the communication is intended to enable multiple eSIMs 208 without STK scheduling. At 502, a reset of the eUICC 108 can occur, e.g., as a result of powering on the UE 102 in which the eUICC 108 is housed. The eUICC 108 can store multiple eSIMs 208, e.g., eSIM A 208A and eSIM B 208B. Initially, after power on reset, both eSIM A 208A and eSIM B 208B can be in a disabled state. At 504, the eUICC 108 can send a message to the baseband processor 110 indicating that the eUICC 108 is capable of supporting multiple, simultaneously enabled eSIMs 208, i.e., the eUICC 108 is multiple enabled profile (MEP) capable. At 506, the baseband processor 110 can determine that both eSIM A 208A and eSIM B 208B are in a disabled state. In some instances, a notification of the disabled state can be provided to a user of the UE 102. At 508, the baseband processor 110 can determine that both eSIM A 208A and eSIM B 208B are to be enabled, e.g., as a result of an input from a user of the UE 102 or from a setting indicating both eSIM A 208A and eSIM B 208B were previously enabled (e.g., before a power up of the UE 102 or other action that caused the reset at 502 to occur). Without STK scheduling, the baseband processor 110 can seek to establish STK sessions to enable eSIM A 208A and eSIM B 208B in parallel, which can result in errors as discussed further herein. At 510, the baseband processor 110 sends a message to the eUICC 108 to enable eSIM A 208A. At 512, the eUICC 108 responds with an OK response message. At 514, the baseband processor 110 sends a TERMINAL PRO- FILE DOWNLOAD message to the eUICC 108 for eSIM A 208A. At 516, the eUICC 108 responds with a 91XX command indicating a pending proactive command for the eUICC 108. At 518, the eUICC 108 sends a FETCH COMMAND to the eUICC to retrieve the pending proactive command. At 520, the eUICC 108 sends the proactive command to the baseband processor, where the proactive command indicates establishment of an event list for eSIM A. Without STK scheduling, at 522, the baseband processor 110 sends a second message to the eUICC 108 to enable eSIM B 208B. At 524, the eUICC 108 determines that eSIM B 208B cannot be enabled because one or more processes are busy handling events for eSIM A 208A. The eUICC 108 responds to the enable request for eSIM B from the baseband processor 110 with a 9300 TOOLKIT BUSY ERROR message. Without STK scheduling, the baseband processor 110 continues, at 528, with eSIM A 208A, by sending a terminal response message to set up the event list for eSIM A 208A. At 930, the eUICC 108 responds with a 9000 status message. The impact of parallel STK sessions for eSIM A 208A and eSIM B 208B can result in numerous errors at 532, such as the baseband processor 110 not providing proper status messages associated with "events" to the eUICC 108 (e.g., voice call status, IMS registration status, location status), and incorrect or missing status information can negatively impact voice call initiation and establishment, UE registration, data connections, etc.

Figure 5B:
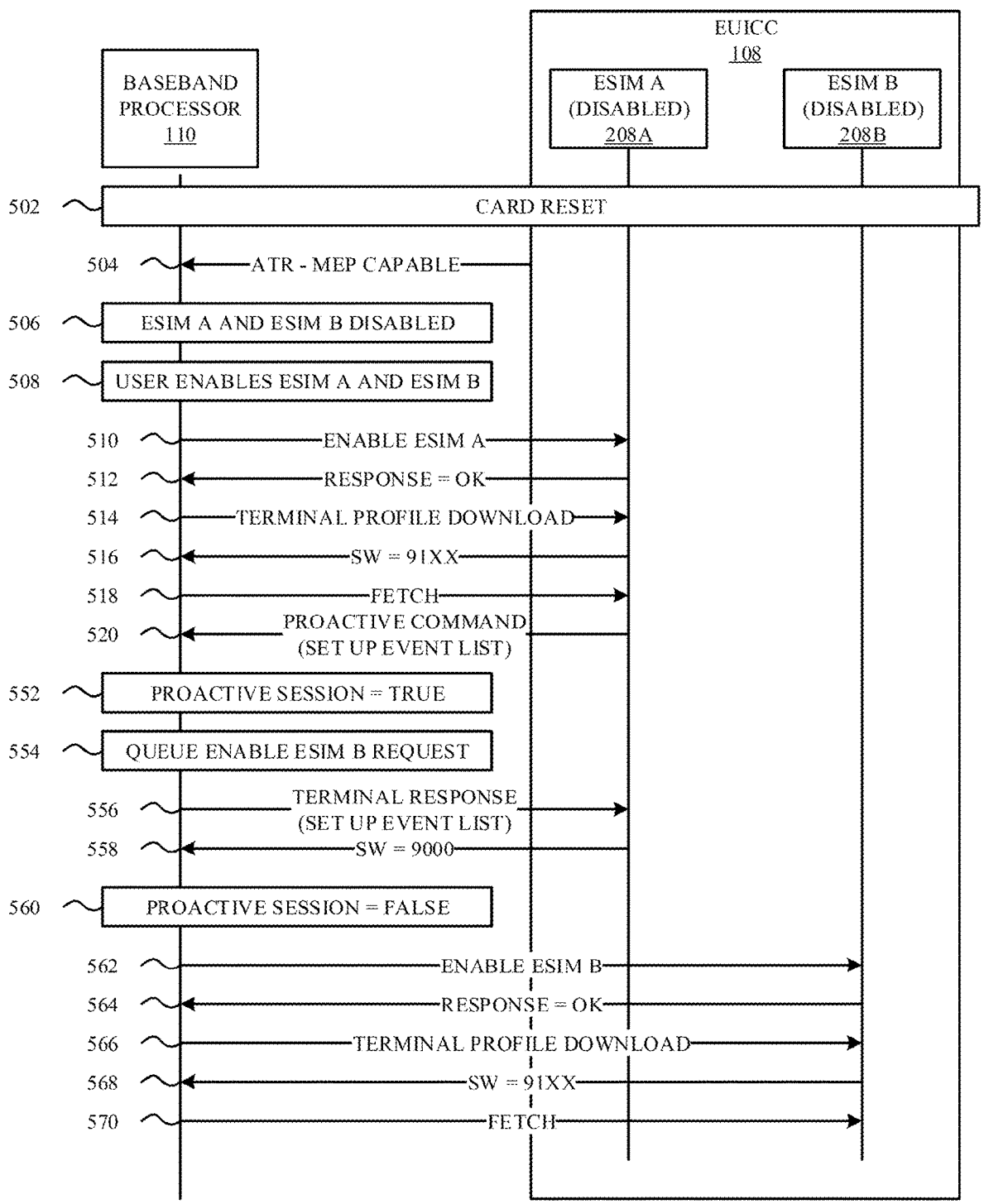
FIG. 5B illustrates an example of communication to enable multiple eSIMs with STK scheduling to reduce errors, according to some embodiments.

FIG. 5B illustrates a diagram 550 of communication between a baseband processor 110 of UE 102 and an eUICC 108 of UE 102, where the communication enables multiple eSIMs 208 sequentially with STK scheduling. At 502, a reset of the eUICC 108 can occur, e.g., as a result of powering on the UE 102 in which the eUICC 108 is housed. The eUICC 108 can store multiple eSIMs 208, e.g., eSIM A 208A and eSIM B 208B. Initially, after power on reset, both eSIM A 208A and eSIM B 208B can be in a disabled state. At 504, the eUICC 108 can send a message to the baseband processor 110 indicating that the eUICC 108 is capable of supporting multiple, simultaneously enabled eSIMs 208, i.e., the eUICC 108 is multiple enabled profile (MEP) capable. At 506, the baseband processor 110 can determine that both eSIM A 208A and eSIM B 208B are in a disabled state. In some instances, a notification of the disabled state can be provided to a user of the UE 102. At 508, the baseband processor 110 can determine that both eSIM A 208A and eSIM B 208B are to be enabled, e.g., as a result of an input from a user of the UE 102 or from a setting indicating both eSIM A 208A and eSIM B 208B were previously enabled (e.g., before a power up of the UE 102 or other action that caused the reset at 502 to occur). At 510, the baseband processor 110 sends a message to the eUICC 108 to enable eSIM A 208A. At 512, the eUICC 108 responds with an OK response message. At 514, the baseband processor 110 sends a TERMINAL PROFILE DOWNLOAD message to the eUICC 108 for eSIM A 208A. At 516, the eUICC 108 responds with a 91XX command indicating a pending proactive command for the eUICC 108. At 518, the eUICC 108 sends a FETCH COMMAND to the eUICC to retrieve the pending proactive command. At 520, the eUICC 108 sends the proactive command to the baseband processor, where the proactive command indicates establishment of an event list for eSIM A. With STK scheduling, at 552, the baseband processor 110, recognizes an ongoing proactive STK session for eSIM A 208A, and at 554, the baseband processor 110 queues the pending request to enable eSIM B 208B to not interfere with the ongoing proactive STK session for eSIM A 208A. At 556, the baseband processor 110 responds to the previous proactive command to establish the event list (received at 520) from the eUICC 108 with a terminal response sent to the eUICC 108 to establish the event list. At 558, the eUICC 108 responds with a 9000 status message. At 560, the proactive STK session for eSIM A 208A concludes, after which the baseband processor 110 can address the pending, queued request to enable eSIM B 208B. At 562, the baseband processor 110 sends a message to the eUICC 108 to enable eSIM B and receives, at 564, an OK response message from the eUICC 108. At 566, the baseband processor 110 sends a terminal profile download message for eSIM B 208B to the eUICC 108. At 568, the baseband processor receives from the eUICC 108 a 91XX message indicating a pending event for eSIM B 208B. At 570, the baseband processor 110 responds with a FETCH message to retrieve the pending event for eSIM B 208B. By delaying execution of the enablement of eSIM B 208B using an STK scheduler 304 until after the pending proactive STK session for eSIM A 208A completes, the baseband processor 110 reduces the probability of errors occurring when processing commands for different eSIMs 208 by the eUICC 108.

Figure 6A:
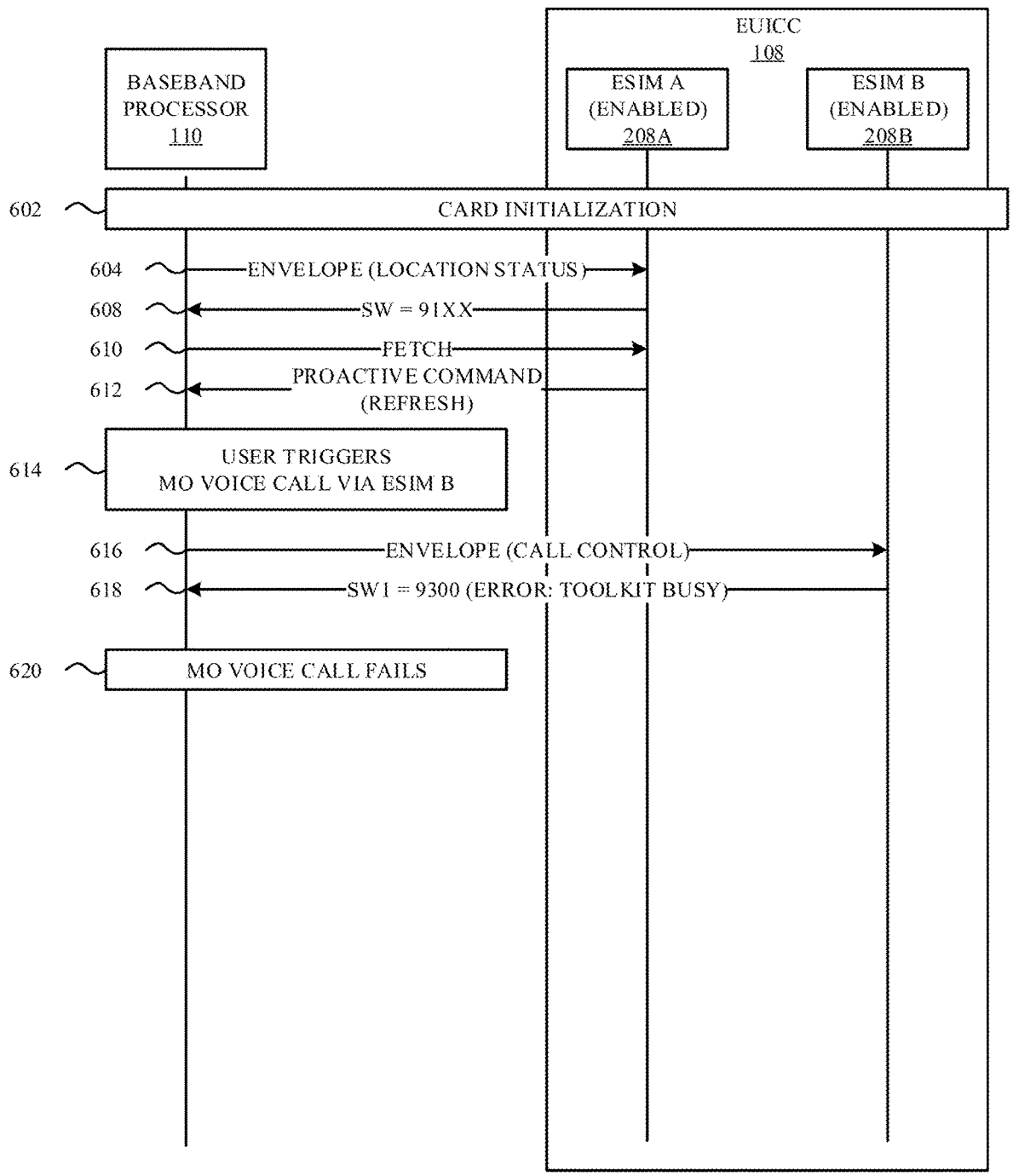
FIG. 6A illustrates an example of communication to originate a voice call without STK scheduling resulting in errors, according to some embodiments.

FIG. 6A illustrates a diagram 600 of communication between a baseband processor 110 of UE 102 and an eUICC 108 of UE 102, where the baseband processor 110 attempts to establish a mobile originated (MO) voice call without STK scheduling. At 602, an initialization of the eUICC 108 occurs. At 604, the baseband processor 110 sends an ENVELOPE message to the eUICC 108 with location status information, e.g., indicating normal service. At 608, the eUICC 108 sends to the baseband processor 110 a 91XX message indicating a pending event, e.g., a pending proactive command, for eSIM A 208A. At 610, the baseband processor 110 sends to the eUICC 108 a FETCH command to retrieve the pending proactive command for eSIM A 208A. At 612, the eUICC 108 responds with the proactive command for eSIM A, e.g., a REFRESH command. At 614, a user of the UE 102 can trigger a mobile originated (MO) voice call to be established using eSIM B 208B. Without STK scheduling, the baseband processor 110 can send, at 616, an ENVELOPE message including CALL CONTROL information to the eUICC 108 for eSIM B 208B. As the eUICC 108 is in the midst of handling the proactive command for eSIM A 208A, the eUICC 108 can respond to the baseband processor 110, at 618, with a 9300 ERROR message including TOOLKIT BUSY. As a result, the eUICC 108 cannot service the request for the MO voice call, and at 620, the MO voice call establishment fails.

Figure 6B:
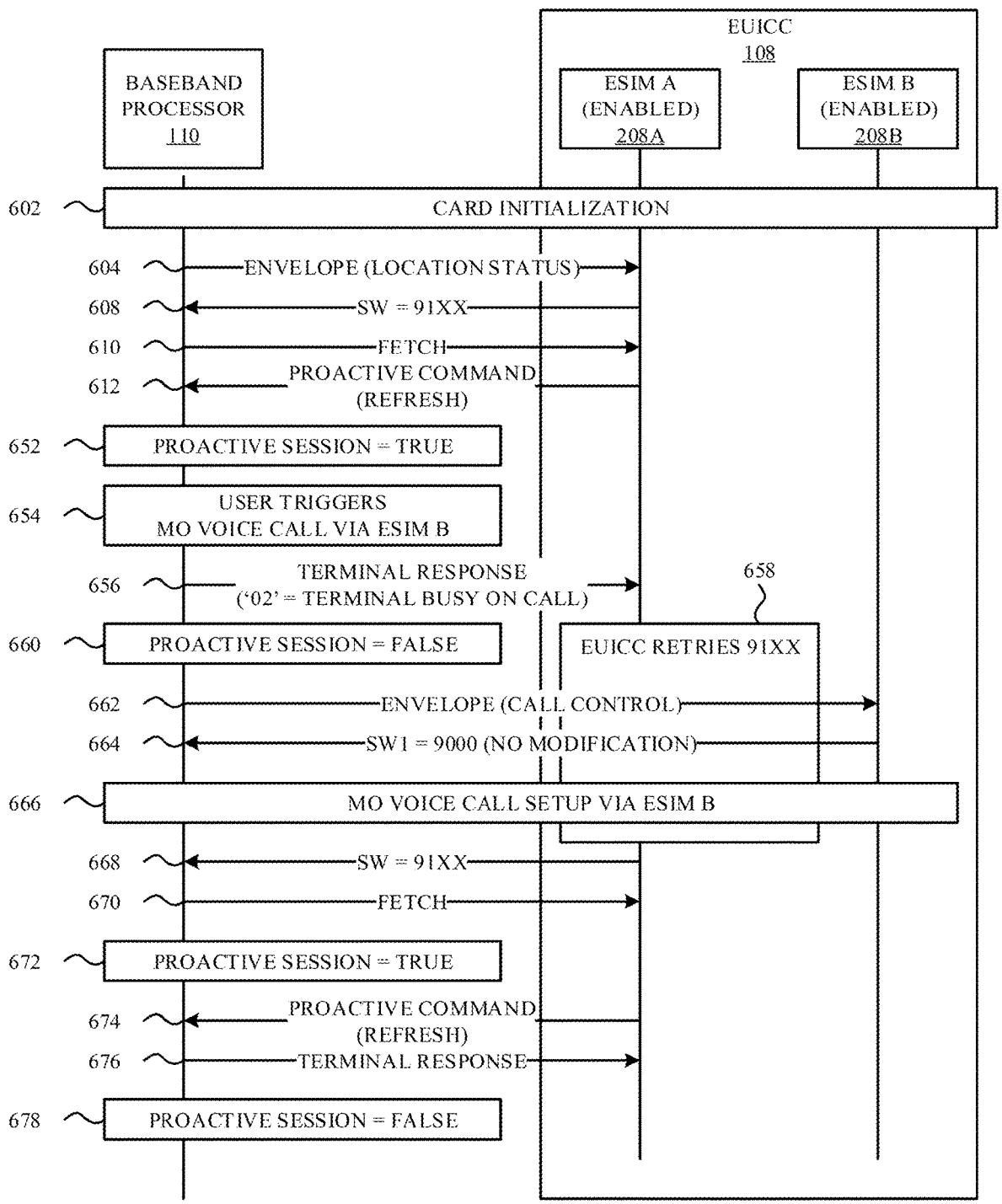
FIG. 6B illustrates an example of communication to originate a voice call with STK scheduling to reduce errors, according to some embodiments.

FIG. 6B illustrates a diagram 650 of communication between a baseband processor 110 of UE 102 and an eUICC 108 of UE 102, where the baseband processor 110 with STK scheduling establishes a mobile originated (MO) voice call for eSIM B 208B to manage an ongoing STK session for eSIM A 208A. An STK scheduler 304 of the baseband processor 110 can monitor for ongoing proactive STK sessions and adjust communication for different eSIMs 208 accordingly. At 602, an initialization of the eUICC 108 occurs. At 604, the baseband processor 110 sends an ENVELOPE message to the eUICC 108 with location status information, e.g., indicating normal service. At 608, the eUICC 108 sends to the baseband processor 110 a 91XX message indicating a pending event, e.g., a pending proactive command, for eSIM A 208A. At 610, the baseband processor 110 sends to the eUICC 108 a FETCH command to retrieve the pending proactive command for eSIM A 208A. At 612, the eUICC 108 responds with the proactive command for eSIM A, e.g., a REFRESH command. With STK scheduling, at 652, the baseband processor 110 recognizes an ongoing proactive STK session for eSIM A 208A. At 654, a user of the UE 102 can trigger an MO voice call via eSIM B 208B. The STK scheduler 304 of the baseband processor 110 can determine that establishment of the MO voice call has a higher priority and supersedes the ongoing proactive STK session for eSIM A 208A. At 656, the baseband processor 110 sends a terminal response message to the eUICC 108 with an indication of TERMINAL BUSY ON CALL status. The eUICC 108 can recognize that the proactive STK session for eSIM A 208A has terminated, and one or more pending events for eSIM A 208 are yet to be serviced. The baseband processor 110, at 660, can determine that the proactive STK session for eSIM A 208A has terminated and subsequently at 662 send an ENVELOPE message to the eUICC 108 to establish the MO call for eSIM B 208B. The eUICC 108 can respond, at 664, with a 9000 status message indicating NO MODIFICATION. At 666, the baseband processor 110 and the eUICC 108 can proceed to establish the MO voice call via eSIM B 208B. At 658, the eUICC 108, when feasible and not interfering with establishment of the MO voice call, can send 91XX messages indicating the pending event(s) for eSIM A 208A to the baseband processor 110. After the MO voice call is established, at 668, a 91XX message from the eUICC 108 indicating the pending event for eSIM A 208A can be received by the baseband processor 110. At 670, the baseband processor 110 sends a FETCH message to the eUICC 108 to retrieve the pending event for eSIM A 208A. At 672, the baseband processor 110 recognizes re-establishment of a proactive STK session for eSIM A 208A. At 674, the baseband processor 110 receives from the eUICC 108 the pending event, e.g., a proactive REFRESH command, and at 676 provides a terminal response message. At 678, the baseband processor 110 recognizes that the proactive STK session for eSIM A 208A has concluded. By prematurely terminating the proactive STK session for eSIM A 208A, at 656, the STK scheduler allows for setting up the prioritized MO voice call and then subsequently handling (after re-establishing) the proactive STK session for eSIM A 208A.

Figure 7A:
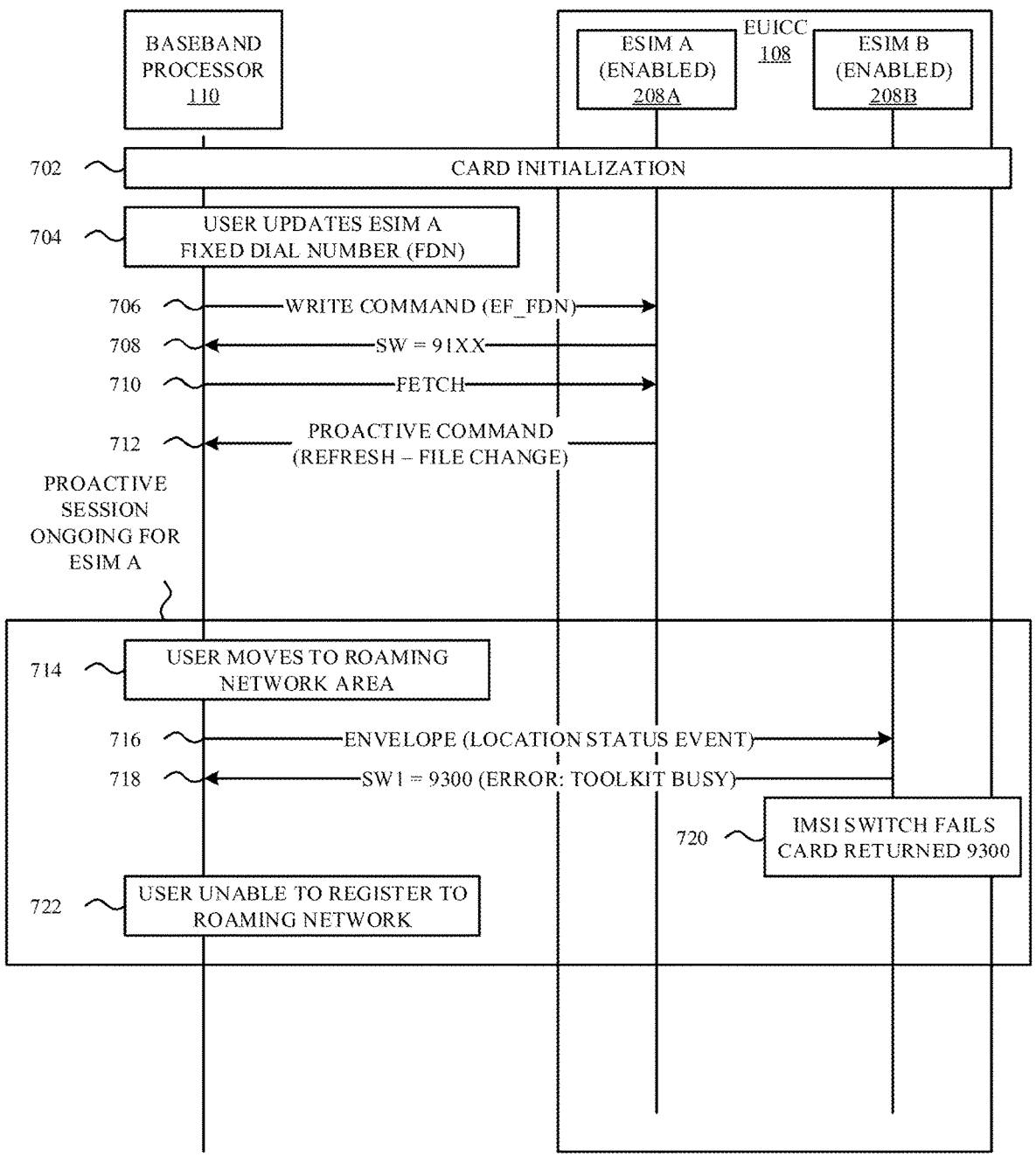
FIG. 7A illustrates an example of communication to attempt an IMSI switch associated with location roaming without STK scheduling resulting in errors, according to some embodiments.

FIG. 7A illustrates a diagram 700 of communication between a baseband processor 110 of UE 102 and an eUICC 108 of UE 102, where the communication is associated with an attempt to perform an IMSI switch for roaming without STK scheduling. At 702, initialization of the eUICC 108 occurs. At 704, a user of the UE 102 updates a fixed dial number (FDN) for eSIM A 208A. At 706, the baseband processor 110 sends a WRITE command message to the eUICC 108 with updated elementary file (EF) information for the FDN for eSIM A 208A. At 708, the eUICC 108 responds to the baseband processor 110 with a 91XX message indicating a pending event for eSIM A 208A. At 710, the baseband processor 110 sends a FETCH command to the eUICC 108 to retrieve the pending event for eSIM A 208A. At 712, the eUICC 108 responds to the baseband processor 110 with the pending event, e.g., a proactive REFRESH-FILE CHANGE command for eSIM A 208A. While a proactive STK session for eSIM A 208A is ongoing, at 714, the UE 102 can change locations, e.g., move to a cellular wireless network region associated with roaming for eSIM B 208B. At 716, the baseband processor 110, as a result of the location change, can send to the eUICC 108 an ENVELOPE with LOCATION STATUS EVENT message for eSIM B 208B. As the STK handler for the eUICC 108 can be already handling the proactive STK session for eSIM A 208A, at 718, the eUICC 108 returns a 9300 TOOLKIT BUSY ERROR message to the baseband processor 110. At 720, a switch of IMSI associated with the location change for eSIM B 208B fails, and at 722, the UE 102 can be unable to register with the roaming cellular wireless network.

Figure 7B:
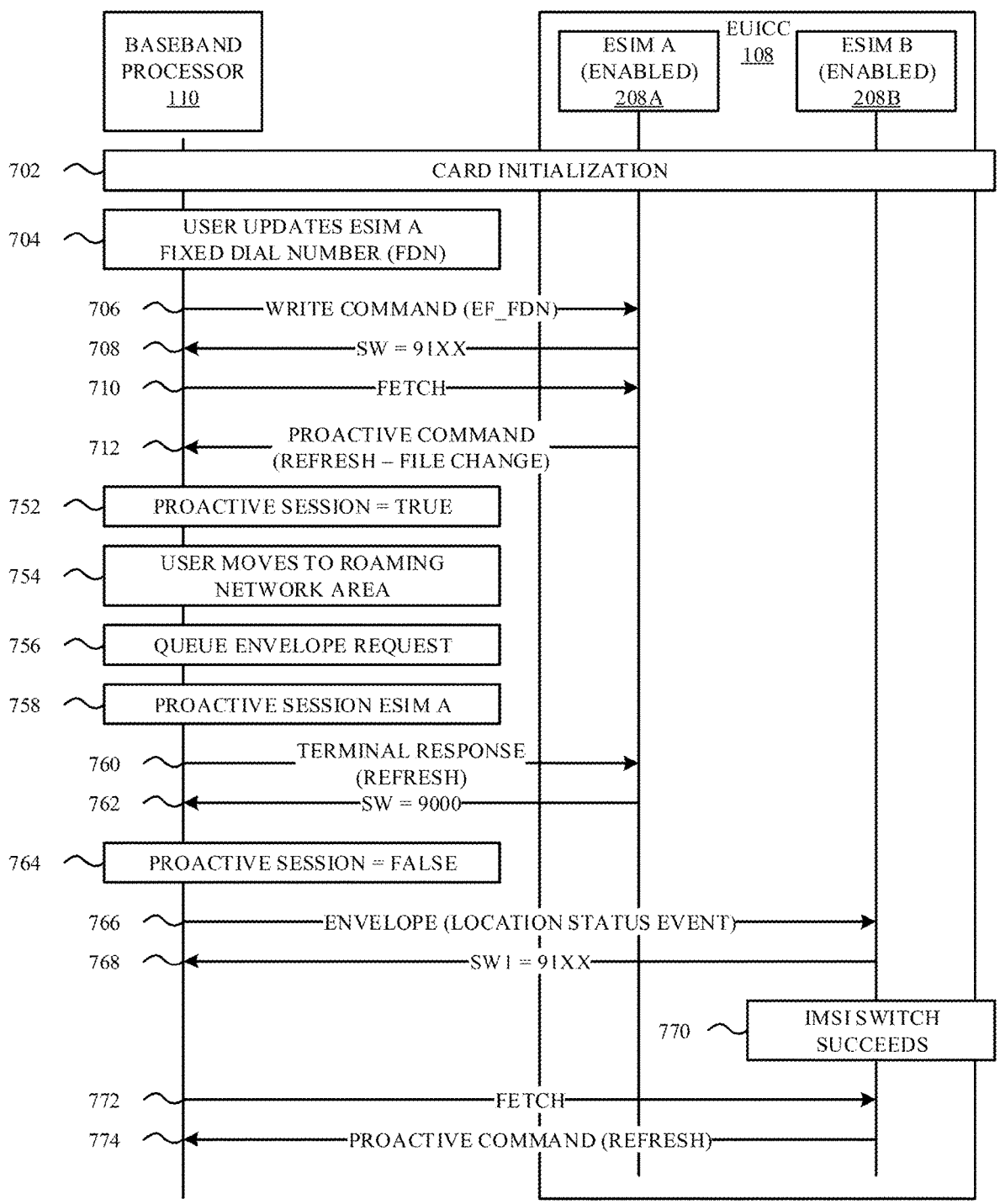
FIG. 7B illustrates an example of communication to cause an IMSI switch associated with location roaming with STK scheduling to reduce errors, according to some embodiments.

FIG. 7B illustrates a diagram 750 of communication between a baseband processor 110 of UE 102 and an eUICC 108 of UE 102, where the communication is associated with an IMSI switch for roaming with STK scheduling. At 702, initialization of the eUICC 108 occurs. At 704, a user of the UE 102 updates a fixed dial number (FDN) for eSIM A 208A. At 706, the baseband processor 110 sends a WRITE command message to the eUICC 108 with updated elementary file (EF) information for the FDN for eSIM A 208A. At 708, the eUICC 108 responds to the baseband processor 110 with a 91XX message indicating a pending event for eSIM A 208A. At 710, the baseband processor 110 sends a FETCH command to the eUICC 108 to retrieve the pending event for eSIM A 208A. At 712, the eUICC 108 responds to the baseband processor 110 with the pending event, e.g., a proactive REFRESH-FILE CHANGE command for eSIM A 208A. At 752, the baseband processor 110 recognizes that a proactive STK session for eSIM A 208A is ongoing. While the proactive STK session for eSIM A 208A is ongoing, at 754, the UE 102 can change locations, e.g., move to a cellular wireless network region associated with roaming for eSIM B 208B. At 756, the baseband processor 110, e.g., an STK scheduler 304 thereof, adds an entry to a queue for an ENVELOPE request associated with the location change to allow the proactive STK session for eSIM A 208A to continue, at 758, uninterrupted by the location change commands. At 760, the baseband processor sends a terminal response REFRESH command to the eUICC 108 for eSIM A 208A and receives in response a status OK 9000 message. At 764, the baseband processor 110 recognizes that the proactive STK session for eSIM A 208A has concluded. At 766, the baseband processor 110 can send the delayed ENVELOPE with LOCATION STATUS EVENT message for eSIM B 208B to the eUICC 108. The eUICC 108 can respond with a 91XX message indicating a pending event for eSIM B 208B. At 770, an IMSI switch for eSIM B 208B associated with the location change of the UE 102 can succeed. At 772, the baseband processor 110 responds to the 91XX message for eSIM B 208B with a FETCH command and receives in response, at 774, from the eUICC 108 a proactive REFRESH command for eSIM B 208B. By queuing actions associated with the location change for eSIM B 208B to be processed after completion of the ongoing proactive STK session for eSIM A 208A, the baseband processor 110 increases the probability of the IMSI switch associated with the location change succeeding.

Figure 8A:
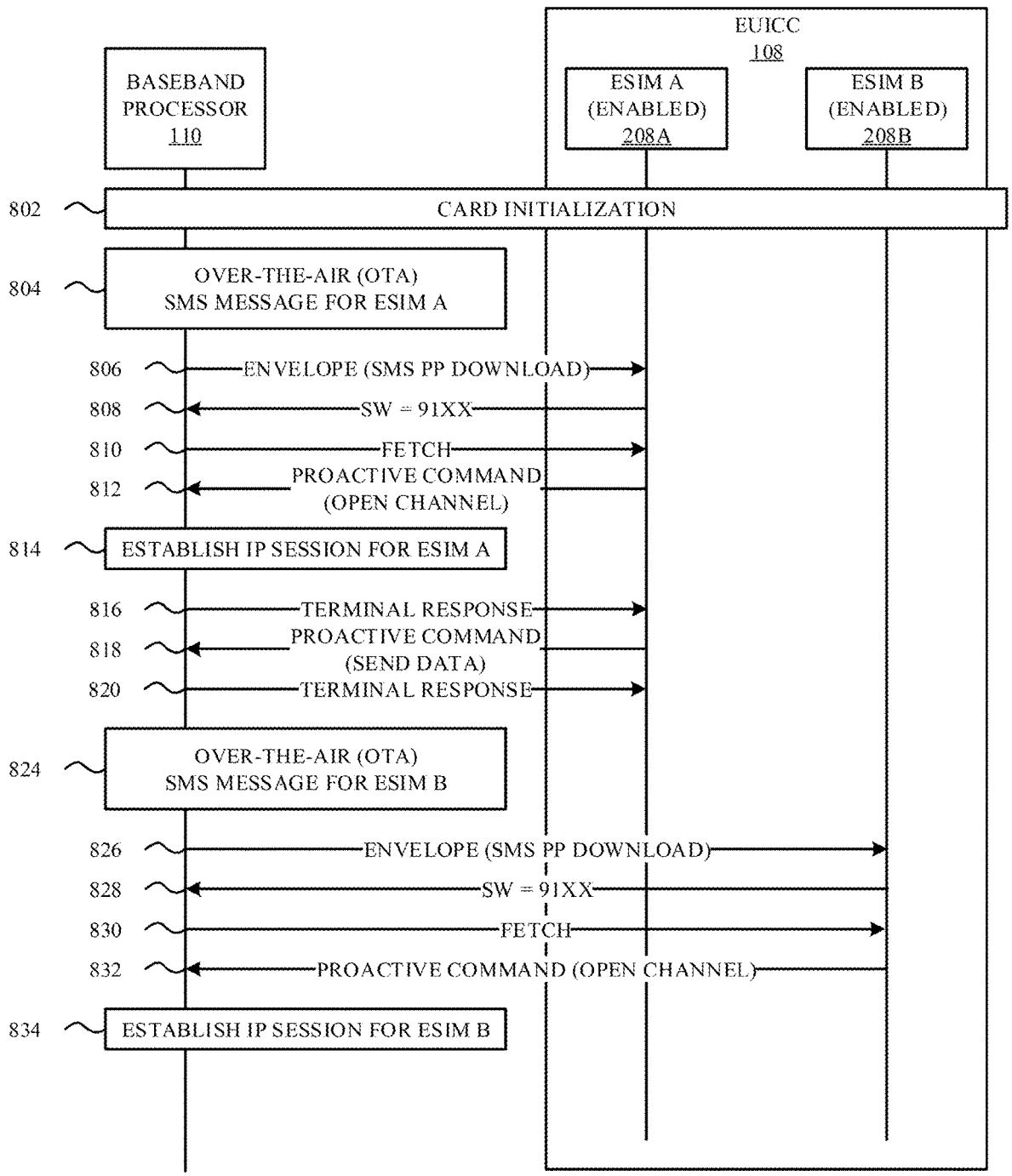
FIGS. 8A and 8B illustrate an example of communication to handle bearer independent protocol (BIP) sessions for eSIMs without STK scheduling resulting in errors, according to some embodiments.
Figure 8B:
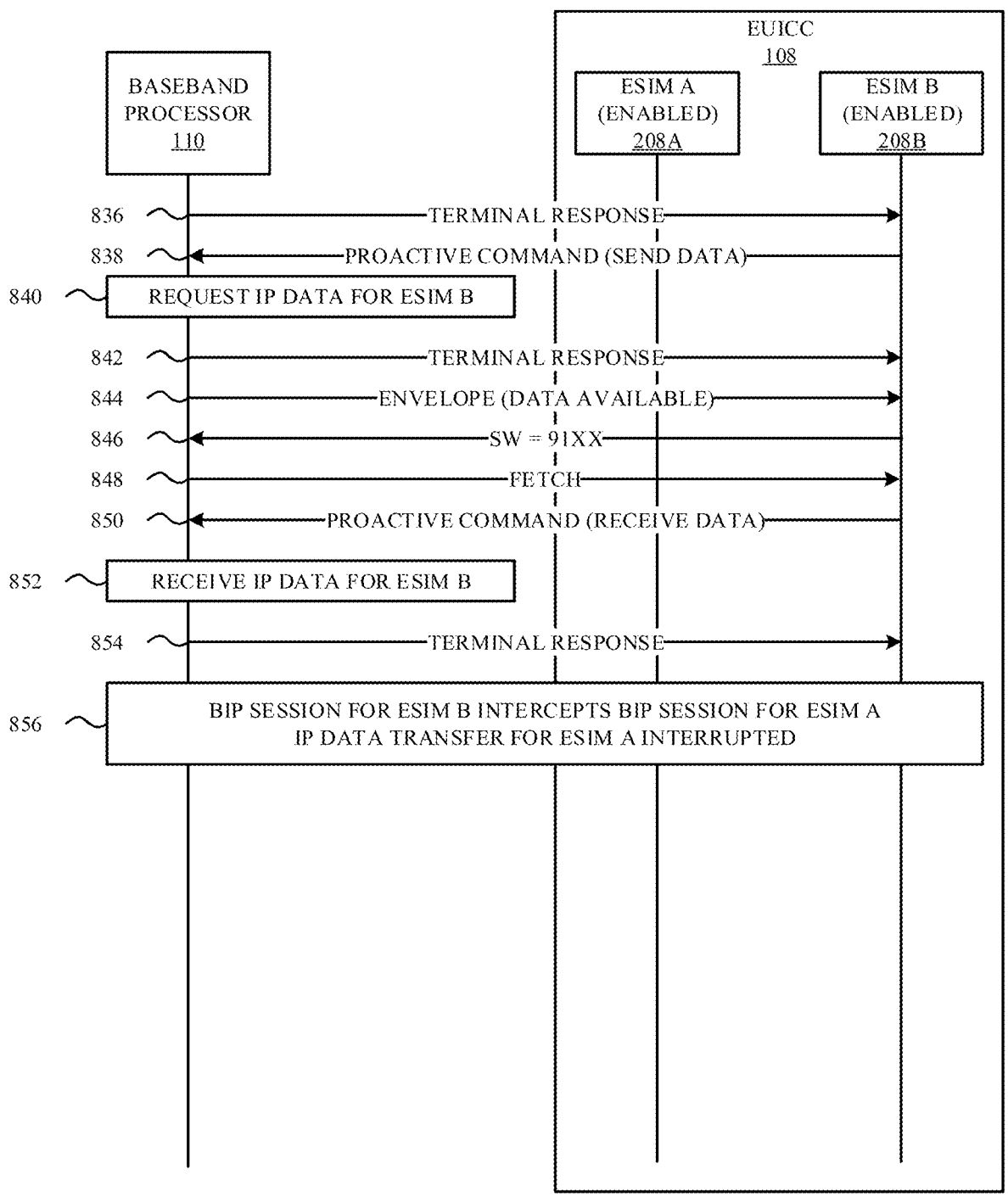

FIGS. 8A and 8B illustrate diagrams 800, 835 of communication between a baseband processor 110 of UE 102 and an eUICC 108 of UE 102, where the communication is associated with bearer independent protocol (BIP) sessions for multiple eSIMs 208 without STK scheduling, resulting in errors. At 802, initialization of the eUICC 108 occurs. At 804, the baseband processor 110 receives a short message service (SMS) message for eSIM A 208A indicating an over-the-air (OTA) update for eSIM A 208A. At 806, the baseband processor 110 sends an ENVELOPE message including an SMS PP DOWNLOAD indication to the eUICC 108 for eSIM A 208A. At 808, the eUICC 108 responds with a 91XX message indicating a pending event for eSIM A 208A. At 810, the baseband processor 110 sends a FETCH command to the eUICC 108 to retrieve the pending event for eSIM A 208A. At 812, the eUICC 108 responds to the baseband processor 110 with the pending event, e.g., a proactive OPEN CHANNEL command for eSIM A 208A. At 814, the baseband processor 110 establishes an Internet Protocol (IP) data session for the OTA update for eSIM A 208A, e.g., using a BIP protocol for the IP session. At 816, the baseband processor 110 provides a terminal response message to the eUICC 108 for eSIM A 208A indicating readiness for the OTA update of eSIM A 208A. At 818, the eUICC 108 sends a proactive command message to the baseband processor 110 to send data for the OTA update for eSIM A 208A. At 820, the baseband processor 110 responds to the eUICC 108 with a terminal response. At 824, the baseband processor 110 receives an SMS message for eSIM B 208B indicating an over-the-air (OTA) update for eSIM B 208B. At 826, the baseband processor 110 sends an ENVELOPE message including an SMS PP DOWNLOAD indication to the eUICC 108 for eSIM B 208B. At 828, the eUICC 108 responds with a 91XX message indicating a pending event for eSIM B 208B. At 830, the baseband processor 110 sends a FETCH command to the eUICC 108 to retrieve the pending event for eSIM B 208B. At 832, the eUICC 108 responds to the baseband processor 110 with the pending event, e.g., a proactive OPEN CHANNEL command for eSIM B 208B. At 834, the baseband processor 110 establishes an Internet Protocol (IP) data session for the OTA update for eSIM B 208B, e.g., using a BIP protocol for the IP session. At this point, two parallel BIP sessions are established, a first BIP session for eSIM A 208A and a second BIP session for eSIM B 208B.

At 836, the baseband processor 110 provides a terminal response message to the eUICC 108 for eSIM B 208B indicating readiness for the OTA update of eSIM B 208B. At 838, the eUICC 108 sends a proactive command message to the baseband processor 110 to send data for the OTA update for eSIM B 208B. At 840, the baseband processor 110 requests IP data for eSIM B 208B, e.g., via the established BIP session for eSIM B 208B. At 842, the baseband processor 110 responds to the eUICC 108 with a terminal response. At 844, the baseband processor 110 sends an ENVELOPE message indicating DATA AVAILABLE for eSIM B 208B to the eUICC 108 and receives a 91XX message in response, at 846, indicating a pending event for eSIM B 208B. At 848, the baseband processor retrieves the pending event for eSIM B 208B by sending a FETCH command to the eUICC 108, and receives in response a proactive command for eSIM B 208B indicating readiness to receive data for eSIM B 208B by the eUICC 108. At 852, the baseband processor 110 can receive incoming data via the established BIP session for eSIM B 208B and at 854 provide a terminal response message to the eSIM B 208B. As noted at 856, the BIP session for eSIM B 208B intercepts the BIP session for eSIM A 208A, and IP data transfer for the OTA update for eSIM A 208A is interrupted by the IP data transfer for the OTA update for eSIM B 208B. In some instances, interruption of data transfer can cause the OTA update (or other data transfer for the BIP session) of one eSIM to fail because of servicing the OTA update (or other data transfer for the BIP session) for the other eSIM. Parallel processing of two BIP sessions for two different eSIMs 208 can be problematic, in some cases resulting in data transfer errors.

Figure 8C:
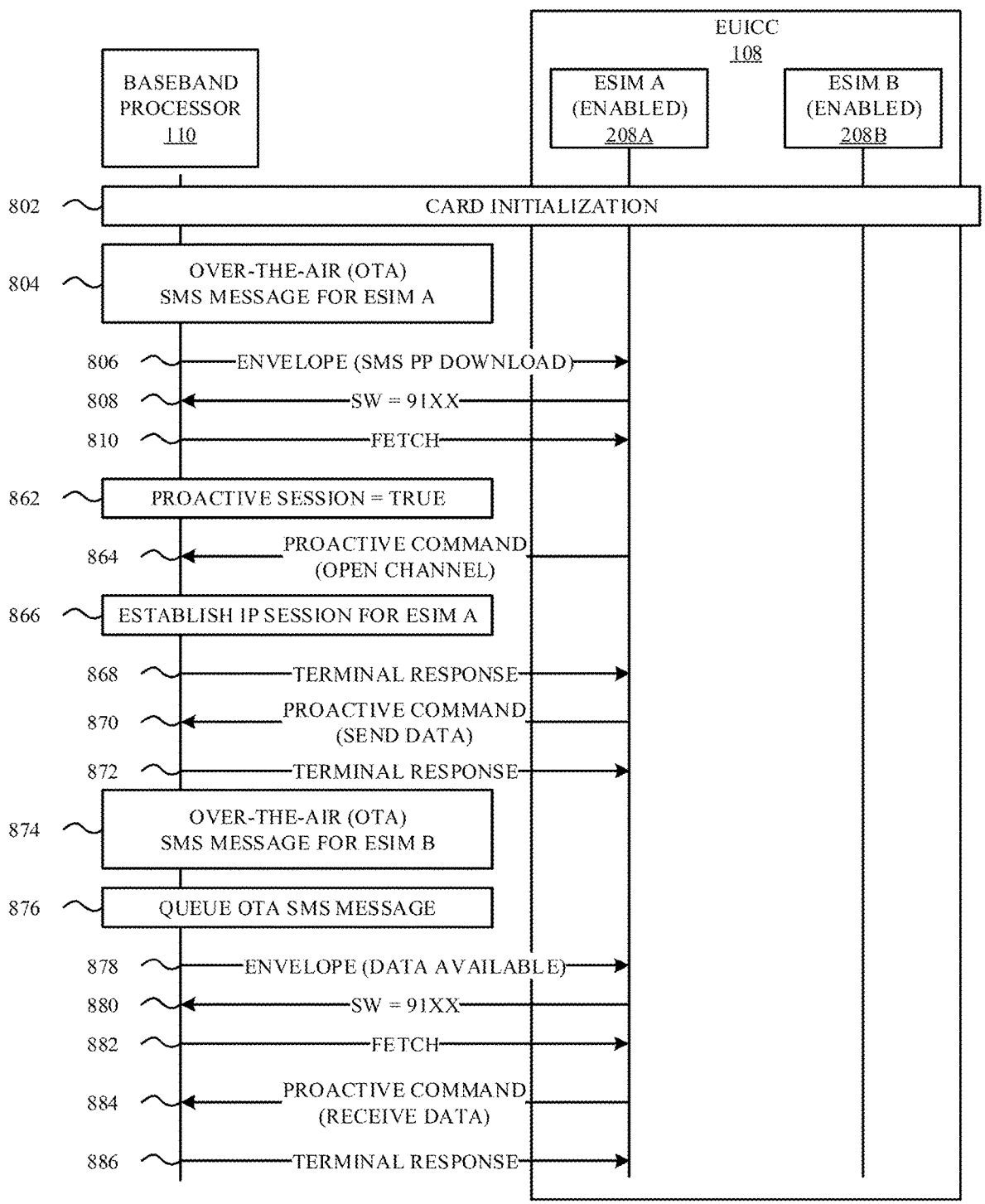
FIGS. 8C and 8D illustrates an example of communication to handle BIP sessions for eSIMs with STK scheduling to reduce errors, according to some embodiments.
Figure 8D:
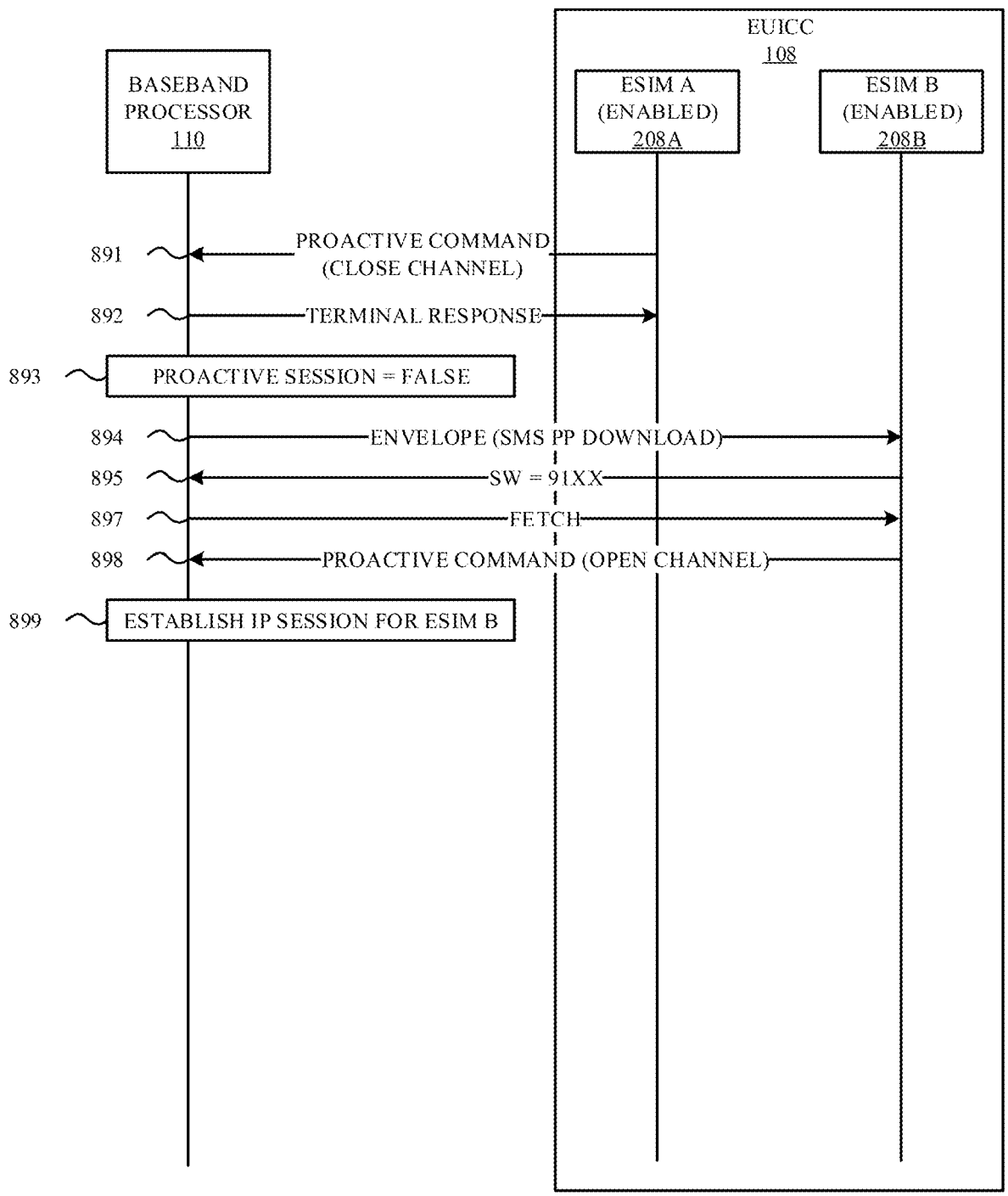

FIGS. 8C and 8D illustrate diagrams 860, 890 of communication between a baseband processor 110 of UE 102 and an eUICC 108 of UE 102, where the communication is associated with bearer independent protocol (BIP) sessions for multiple eSIMs 208 with STK scheduling to reduce errors. At 802, initialization of the eUICC 108 occurs. At 804, the baseband processor 110 receives a short message service (SMS) message for eSIM A 208A indicating an over-the-air (OTA) update for eSIM A 208A. At 806, the baseband processor 110 sends an ENVELOPE message including an SMS PP DOWNLOAD indication to the eUICC 108 for eSIM A 208A. At 808, the eUICC 108 responds with a 91XX message indicating a pending event for eSIM A 208A. At 810, the baseband processor 110 sends a FETCH command to the eUICC 108 to retrieve the pending event for eSIM A 208A. At 862, the baseband processor 110 recognizes that a proactive STK session for eSIM A 208A is ongoing. At 864, the eUICC 108 responds to the baseband processor 110 with the pending event, e.g., a proactive OPEN CHANNEL command for eSIM A 208A. At 866, the baseband processor 110 establishes an Internet Protocol (IP) data session for the OTA update for eSIM A 208A, e.g., using a BIP protocol for the IP session. At 868, the baseband processor 110 provides a terminal response message to the eUICC 108 for eSIM A 208A indicating readiness for the OTA update of eSIM A 208A. At 870, the eUICC 108 sends a proactive command message to the baseband processor 110 to send data for the OTA update for eSIM A 208A. At 872, the baseband processor 110 responds to the eUICC 108 with a terminal response. At 874, the baseband processor 110 receives an SMS message for eSIM B 208A indicating an over-the-air (OTA) update for eSIM B 208B. As the proactive STK session for eSIM A 208A is ongoing, the baseband processor 110, at 876, queues the OTA update SMS message for eSIM B 208B for processing later. At 878, the baseband processor 110 continues with the proactive STK session for eSIM A 208A by sending an ENVELOPE message including a DATA AVAILABLE indication to the eUICC 108 for eSIM A 208A. At 880, the eUICC 108 responds with a 91XX message indicating a pending event for eSIM A 208A. At 882, the baseband processor 110 sends a FETCH command to the eUICC 108 to retrieve the pending event for eSIM A 208BA. At 884, the eUICC 108 sends a proactive RECEIVE DATA command to the baseband processor 110 for eSIM A 208A. At 886, the baseband processor 110 responds to the eUICC 108 with a terminal response. At 891, the eUICC 108 sends a proactive CLOSE CHANNEL command to the baseband processor 110 to end the proactive STK session for eSIM A 208A. At 892, the baseband processor 110 responds to the eUICC 108 with a terminal response message. At 893, the baseband processor 110 recognizes that the proactive STK session for eSIM A 208A has completed. The baseband processor 110, at 894, retrieves the previously queued OTA update SMS message for eSIM B 208B and initiates the OTA update for eSIM B 208B by sending an ENVELOPE message includes an SMS PP DOWNLOAD to the eUICC 108 for eSIM B 208B. At 895, the eUICC 108 responds with a 91XX message indicating a pending event for eSIM B 208B. At 897, the baseband processor 110 sends a FETCH command to retrieve the pending event for eSIM B 208B. The eUICC 108 responds at 898 with a proactive OPEN CHANNEL command message for eSIM B 208B. At 899, the baseband processor 110 establishes an IP session for the OTA update for eSIM B 208B, e.g., using a BIP protocol for the IP session. Subsequently the OTA update for eSIM B 208B can proceed (not shown). By delaying execution of establishment of the second IP session for the OTA update of eSIM B 208B until the first IP session for the OTA update of eSIM A 208A, the baseband processor 110 avoids collision of communication of data for the two IP sessions.

Figure 9:
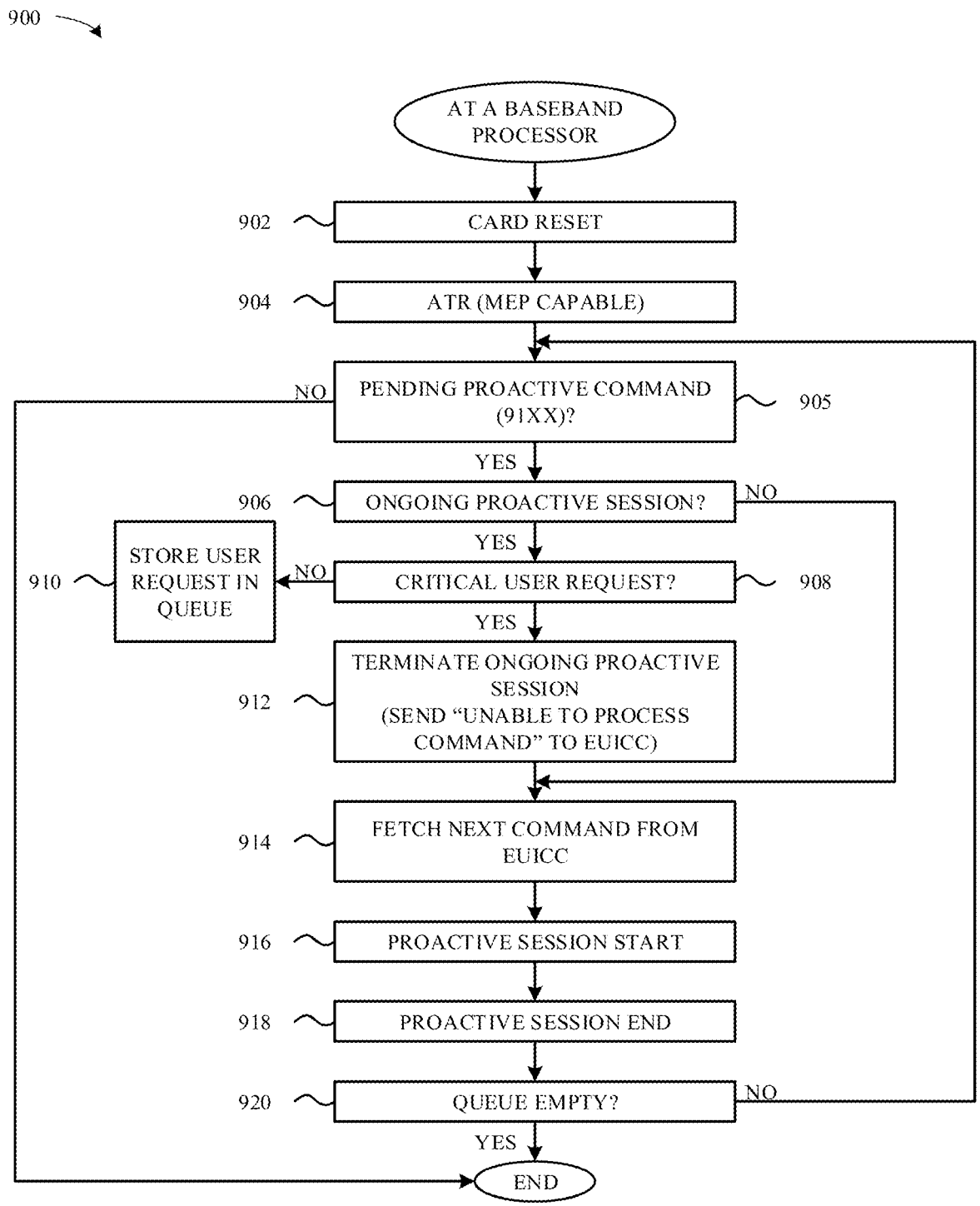
FIG. 9 illustrates a flow diagram of an exemplary sequence of actions by a baseband processor of a wireless device to schedule SIM toolkit (STK) communication with an eUICC, according to some embodiments.

FIG. 9 illustrates a flowchart 900 of an exemplary set of actions taken by a baseband processor 110 of a UE 102 to schedule STK communication for multiple eSIMs 208 of an eUICC 108 of the UE 102. At 902, a rest of the eUICC 108 occurs. At 904, the eUICC 108 sends an ATR message indicating that the eUICC 108 is capable of multiple enabled eSIM 208 profiles (MEP capable). At 905, the baseband processor 110 determines wither there is a pending proactive 91XX command from the eUICC 108 for an eSIM 208, the 91XX command indicating a pending event for the eSIM 208. When there is no pending proactive 91XX command, the process can end. When there is a pending proactive 91XX command indicating a pending event for the eSIM 208, the baseband processor 110 can determine, at 906, whether there is an ongoing proactive STK session for the eSIM 208. When there is no ongoing proactive STK session for the eSIM 208, the baseband processor proceeds to 914 to retrieve the pending event for the eSIM 208, e.g., by sending a FETCH command to the eUICC 108. At 916, the baseband processor 110 recognizes that a proactive STK session for the eSIM 208 has started. After intervening processing (not shown), at 918, the baseband processor 110 recognizes that the proactive STK session for the eSIM 208 has completed. At 920, the baseband processor 110 determines whether a queue of pending actions (or messages or other indications) is empty. When the queue is empty, the process can end. When the queue is not empty the baseband processor 110 can continue by returning to 905 to determine whether a proactive 91XX command is pending. When there is an ongoing proactive STK session for the eSIM 208, as determined at 906, the baseband processor 110 can determine whether there is a critical user request to be serviced that can supersede the ongoing proactive STK session for the eSIM 208. It is noted that the critical user request can be for an action that impacts a different eSIM 208 of the eUICC 108, e.g., to establish an MO voice call for a second eSIM 208 of the eUICC 108. When the baseband processor 110 determines, at 908, that the user request is not critical, e.g., not of a sufficiently high priority to supersede the ongoing STK session for the eSIM 208, the baseband processor 110, at 910, stores the user request (e.g., an indication of a command associated with the user request) in a pending action queue for processing later, e.g., when the ongoing proactive STK session for the eSIM 208 concludes. When the baseband processor 110 determines, at 908, that the user request is critical, e.g., of a sufficiently high priority to supersede the ongoing proactive STK session for the eSIM 208, the baseband processor 110, at 912 terminates the ongoing proactive STK session for the eSIM 208, e.g., by sending to the eUICC 108 an "unable to process command" reply message or comparable termination message to stop the ongoing proactive STK session for the eSIM 208 and allow for processing the critical user request. In some embodiments, the proactive STK session for the eSIM 208 can be restarted after processing actions associated with the critical user request.

Figure 10:
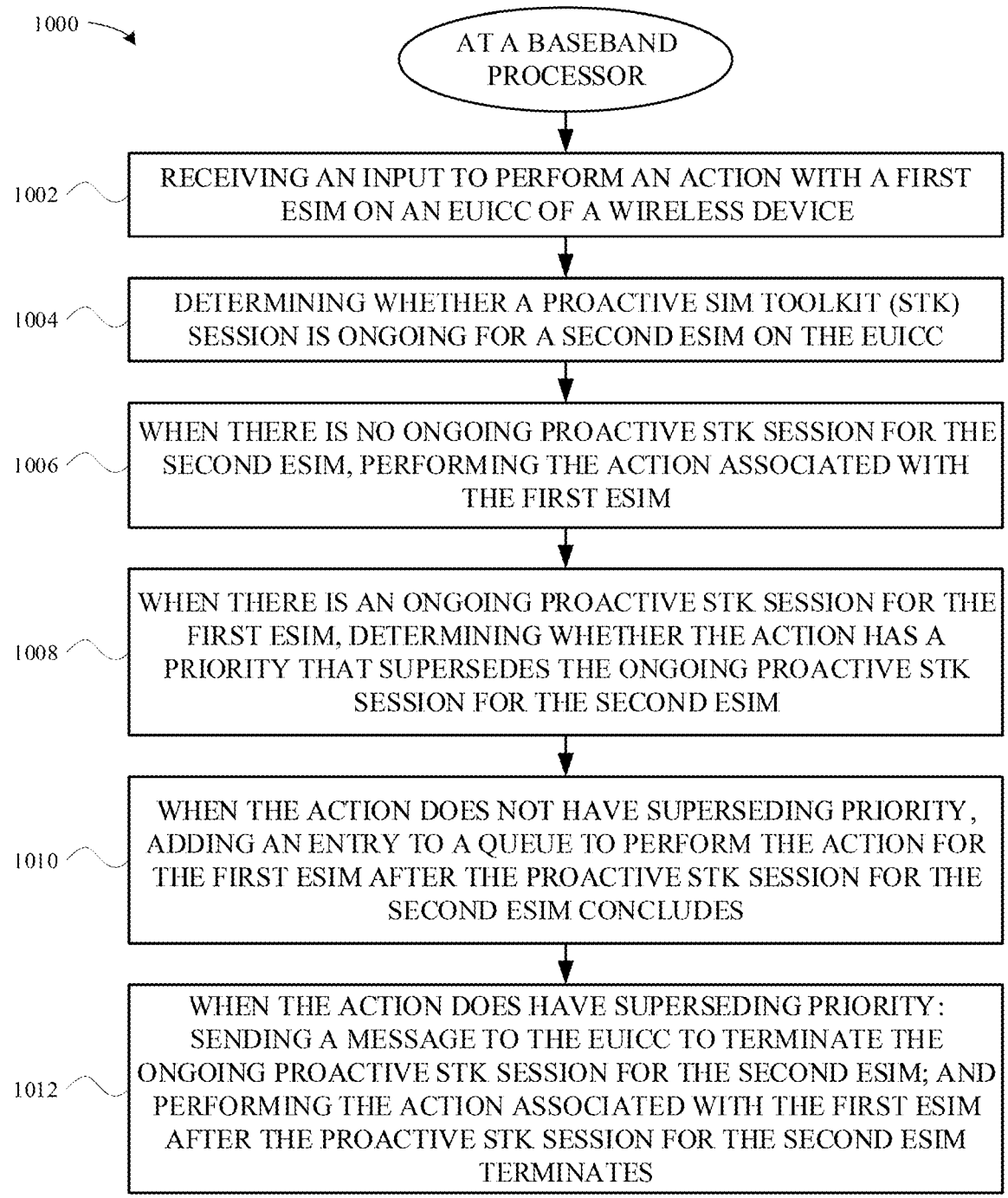
FIG. 10 illustrates a flow diagram of an exemplary set of actions performed by an apparatus of a wireless device to perform STK scheduling for multiple eSIMs of an eUICC, according to some embodiments.

FIG. 10 illustrates a flowchart 1000 of an exemplary set of actions performed by an apparatus of a wireless device 102 to perform STK scheduling for multiple eSIMs 208 of an eUICC 108. At 1002, the apparatus receives an input to perform an action with a first eSIM 208 of the eUICC 108 of the wireless device 102. At 1004, the apparatus determines whether a proactive STK session for a second eSIM 208 on the eUICC 108 is ongoing. At 1006, when there is no ongoing proactive STK session for the second eSIM 208, the apparatus performs the action associated with the first eSIM 208. At 1008, when there is an ongoing proactive STK session for the first eSIM 208, the apparatus determines whether the action has a priority that supersedes the ongoing proactive STK session for the second eSIM 208. At 1010, when the action does not have superseding priority, the apparatus adds an entry to a queue to perform the action for the first eSIM 208 after the proactive STK session for the second eSIM 208 concludes. At 1012, when the action does have superseding priority, the apparatus sends a message to the eUICC 108 to terminate the ongoing proactive STK session for the second eSIM 208 and subsequently performs the action associated with the first eSIM 208 after the proactive STK session for the second eSIM 208 terminates.

Figure 11:
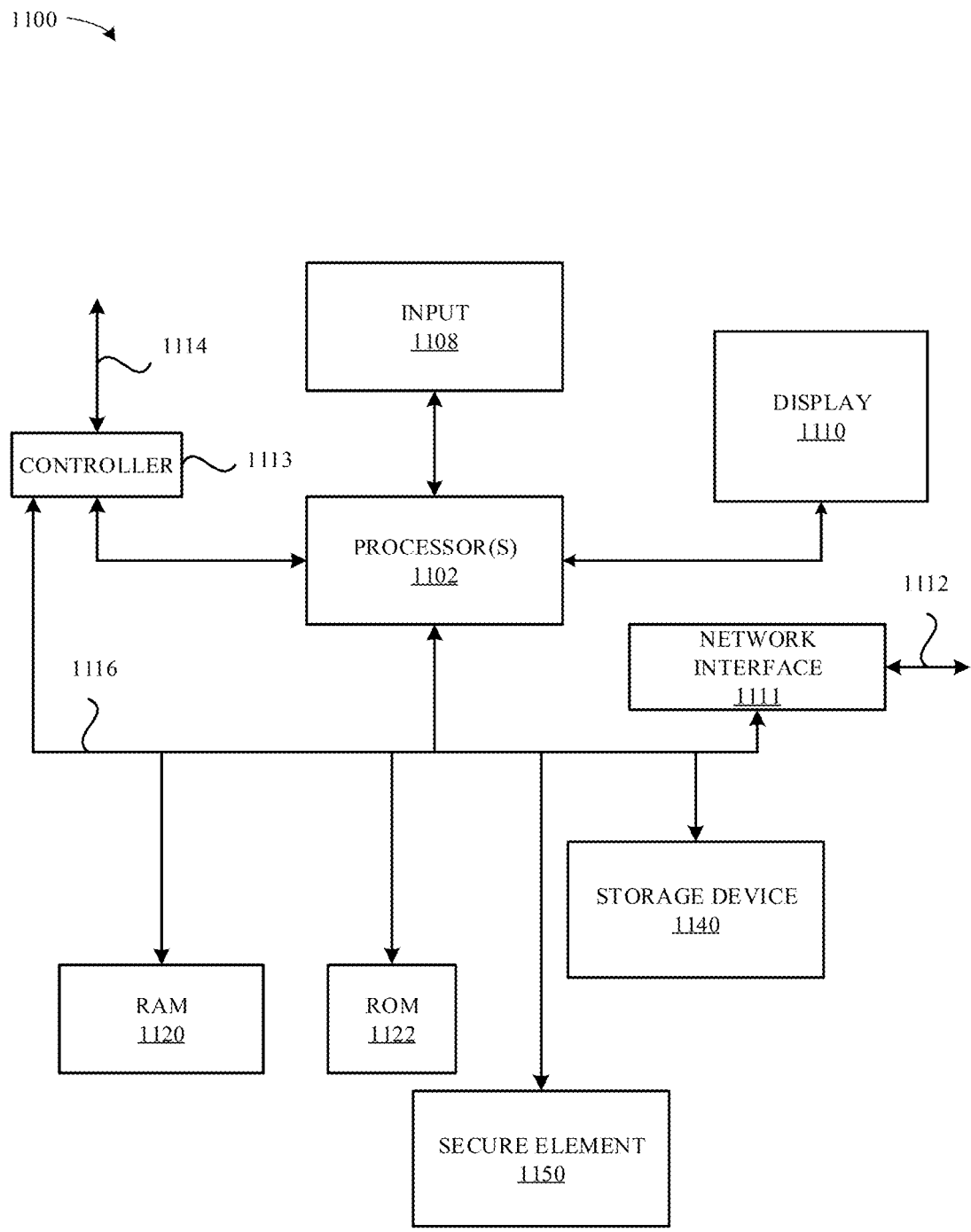
FIG. 11 illustrates a detailed view of a representative computing device that can be used to implement various methods described herein, according to some embodiments.

FIG. 11 illustrates a detailed view of a representative computing device 1100 that can be used to implement various methods described herein, according to some embodiments. In particular, the detailed view illustrates various components that can be included in the UE 102 illustrated in FIG. 1. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 610 that can be controlled by the processor 1102 to display information to the user. A data bus 1116 can facilitate data transfer between at least a storage device 1140, the processor 1102, and a controller 1113. The controller 1113 can be used to interface with and control different equipment through and equipment control bus 1114. The computing device 1100 can also include a network/bus interface 1111 that couples to a data link 1112. In the case of a wireless connection, the network/bus interface 1111 can include a wireless transceiver.

The computing device 1100 also includes a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100. The computing device 1100 can further include a secure element (SE) 1150, which can represent the eUICC 108 of the UE 102.

Wireless Technology

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) Long Term Evolution (LTE) and LTE Advanced (LTE-A), fifth generation (5G) new radio (NR), or similar "later generation" cellular wireless access communication capabilities.

Additionally, it should be understood that the UEs described herein may be configured as multi-mode wireless devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, LTE-A, and 5G NR standards or 3GPP2's CDMA2000 (1×RTT, 2xEV-DO, HRPD, eHRPD) standards. Multi-mode UEs can also support communication using wireless local area networking protocols, e.g., the Institute of Electrical and Electronics Engineers (IEEE) 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. An apparatus configured for operation in a wireless device, the apparatus comprising:
at least one processor communicatively coupled a memory storing instructions that, when executed by the at least one processor, cause the apparatus to:
receive an input to perform an action associated with a first electronic subscriber identity module (eSIM) on an embedded universal integrated circuit card (eUICC) of the wireless device;
determine whether a proactive SIM toolkit (STK) session is ongoing for a second eSIM on the eUICC;
when there is no ongoing proactive STK session for the second eSIM, perform the action associated with the first eSIM; and
when there is an ongoing proactive STK session for the first eSIM:
determine whether the action has a priority that supersedes the ongoing proactive STK session for the second eSIM;
when the action does not have superseding priority, add an entry to a queue to perform the action for the first eSIM after the proactive STK session for the second eSIM concludes; and
when the action does have superseding priority:
send a message to the eUICC to terminate the ongoing proactive STK session for the second eSIM; and
perform the action associated with the first eSIM after the proactive STK session for the second eSIM terminates.

2. The apparatus of claim 1, wherein:
the apparatus determines the proactive STK session is ongoing for the second eSIM based on receipt of a proactive command from the eUICC for the second eSIM to which a response from the apparatus to the eUICC has not been completed.

3. The apparatus of claim 2, wherein:
the action comprises enabling the first eSIM;
the proactive STK session is associated with enabling the second eSIM; and
the action to enable the first eSIM does not have superseding priority over enabling the second eSIM.

4. The apparatus of claim 1, wherein execution of the instructions further causes the apparatus to:
determine the ongoing proactive STK session has ended; and
perform an action for the first eSIM or the second eSIM based on a next pending item in the queue.

5. The apparatus of claim 1, wherein:
the action comprises establishing a mobile originated call via the first eSIM;
the proactive STK session is associated with responding to a refresh command; and
the action to establish the mobile originated call via the first eSIM does have superseding priority over responding to the refresh command.

6. The apparatus of claim 5, wherein the message to the eUICC to terminate the ongoing proactive STK session for the second eSIM comprises a terminal response message indicating to the eUICC that the wireless device is busy on the mobile originated call.

7. The apparatus of claim 1, wherein:
the action comprises updating a location area for the first eSIM based mobility of the wireless device;
the proactive STK session is associated with updating an international mobile subscriber identity (IMSI) value associated with the second eSIM; and
the action to update the location area for the first eSIM does not have superseding priority over updating the IMSI value for the second eSIM.

8. The apparatus of claim 1, wherein:
the action comprises establishing an internet protocol (IP) data session for the first eSIM;

the proactive STK session comprises an IP data session for the second eSIM; and the action to establish the IP data session for the first eSIM does not have superseding priority to the IP data session for the second eSIM.

9. The apparatus of claim 1, wherein the apparatus comprises a baseband processor external to the eUICC of the wireless device.

10. A method for subscriber identity toolkit (STK) scheduling for a wireless device configured with multiple electronic subscriber identity module (eSIM) profiles, the method comprising:

by a baseband processor external to an embedded universal integrated circuit card (eUICC) of the wireless device:

receive an input to perform an action associated with a first electronic subscriber identity module (eSIM) on the eUICC of the wireless device;

determine whether a proactive STK session is ongoing for a second eSIM on the eUICC;

when there is no ongoing proactive STK session for the second eSIM, perform the action associated with the first eSIM; and when there is an ongoing proactive STK session for the first eSIM:

determine whether the action has a priority that supersedes the ongoing proactive STK session for the second eSIM;

when the action does not have superseding priority, add an entry to a queue to perform the action for the first eSIM after the proactive STK session for the second eSIM concludes; and when the action does have superseding priority:

send a message to the eUICC to terminate the ongoing proactive STK session for the second eSIM; and perform the action associated with the first eSIM after the proactive STK session for the second eSIM terminates.

11. The method of claim 10, wherein:
the baseband processor determines the proactive STK session is ongoing for the second eSIM based on receipt of a proactive command from the eUICC for the second eSIM to which a response from the baseband processor to the eUICC has not been completed.

12. The method of claim 10, wherein:
the action comprises enabling the first eSIM;
the proactive STK session is associated with enabling the second eSIM; and
the action to enable the first eSIM does not have superseding priority over enabling the second eSIM.

13. The method of claim 10, further comprising:
determining the ongoing proactive STK session has ended; and
performing an action for the first eSIM or the second eSIM based on a next pending item in the queue.

14. The method of claim 10, wherein:
the action comprises establishing a mobile originated call via the first eSIM;
the proactive STK session is associated with responding to a refresh command; and
the action to establish the mobile originated call via the first eSIM does have superseding priority over responding to the refresh command.

15. The method of claim 14, wherein the message to the eUICC to terminate the ongoing proactive STK session for the second eSIM comprises a terminal response message indicating to the eUICC that the wireless device is busy on the mobile originated call.

16. The method of claim 10, wherein:
the action comprises updating a location area for the first eSIM based mobility of the wireless device;
the proactive STK session is associated with updating an international mobile subscriber identity (IMSI) value associated with the second eSIM; and
the action to update the location area for the first eSIM does not have superseding priority over updating the IMSI value for the second eSIM.

17. The method of claim 10, wherein:
the action comprises establishing an internet protocol (IP) data session for the first eSIM;
the proactive STK session comprises an IP data session for the second eSIM; and
the action to establish the IP data session for the first eSIM does not have superseding priority to the IP data session for the second eSIM.

18. A non-transitory computer-readable medium storing instructions that configure a wireless device to:

receive an input to perform an action associated with a first electronic subscriber identity module (eSIM) on an embedded universal integrated circuit card (eUICC) of the wireless device;

determine whether a proactive SIM toolkit (STK) session is ongoing for a second eSIM on the eUICC;

when there is no ongoing proactive STK session for the second eSIM, perform the action associated with the first eSIM; and when there is an ongoing proactive STK session for the first eSIM:

determine whether the action has a priority that supersedes the ongoing proactive STK session for the second eSIM;

when the action does not have superseding priority, add an entry to a queue to perform the action for the first eSIM after the proactive STK session for the second eSIM concludes; and when the action does have superseding priority:

send a message to the eUICC to terminate the ongoing proactive STK session for the second eSIM; and perform the action associated with the first eSIM after the proactive STK session for the second eSIM terminates.

19. The non-transitory computer-readable medium of claim 18, wherein the wireless device determines the proactive STK session is ongoing for the second eSIM based on receipt of a proactive command from the eUICC for the second eSIM to which a response from the wireless device to the eUICC has not been completed.

20. The non-transitory computer-readable medium of claim 18, wherein the instructions further configure the wireless device to:

determine the ongoing proactive STK session has ended; and perform an action for the first eSIM or the second eSIM based on a next pending item in the queue.

* * * * *